United States Patent Office 3,421,014
Patented Jan. 7, 1969

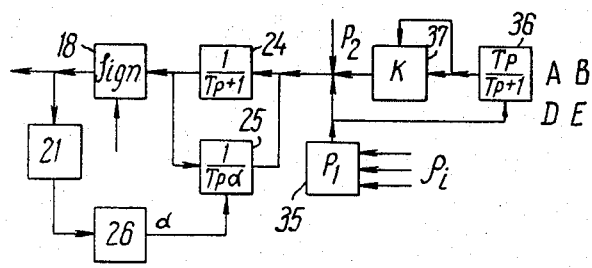
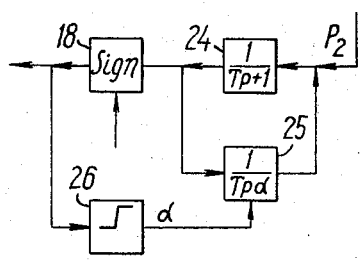
FIG. 8      FIG. 9
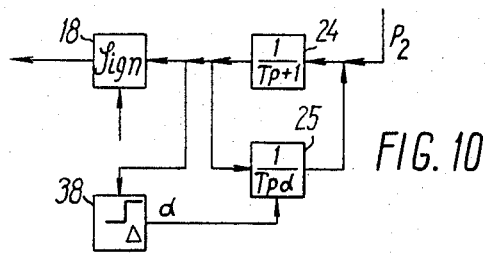
FIG. 10
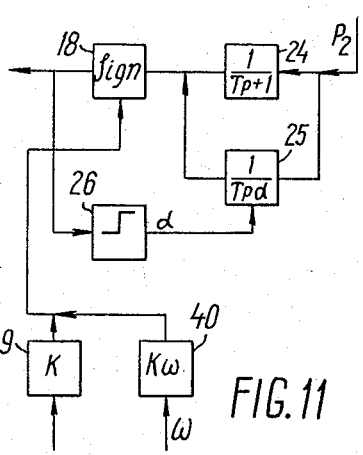
FIG. 11
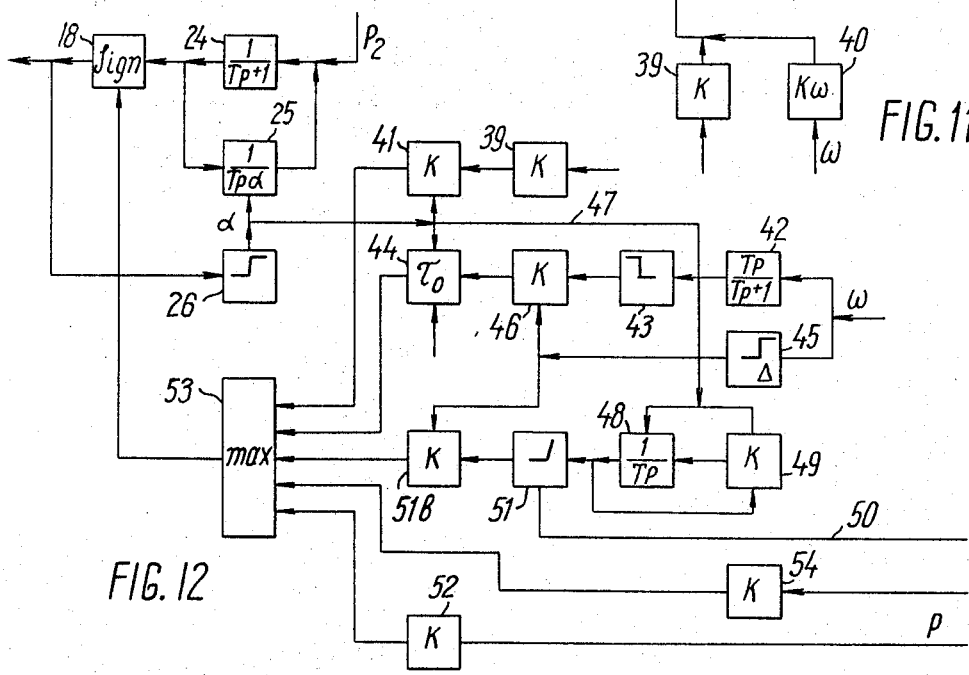
FIG. 12

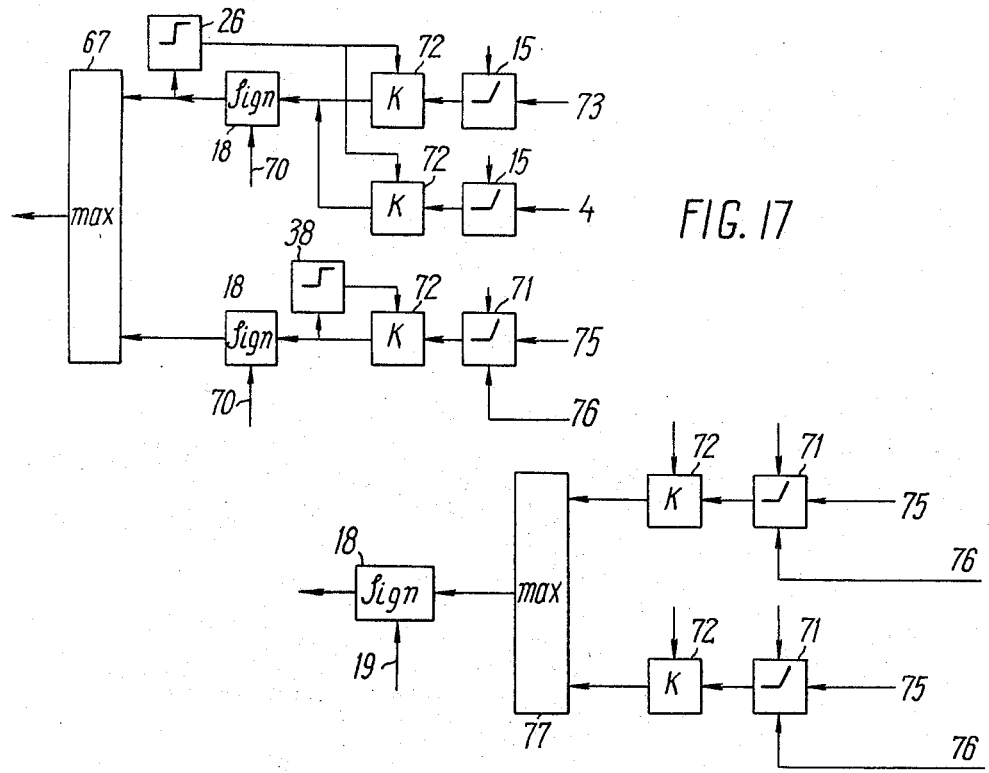
FIG. 17
FIG. 18
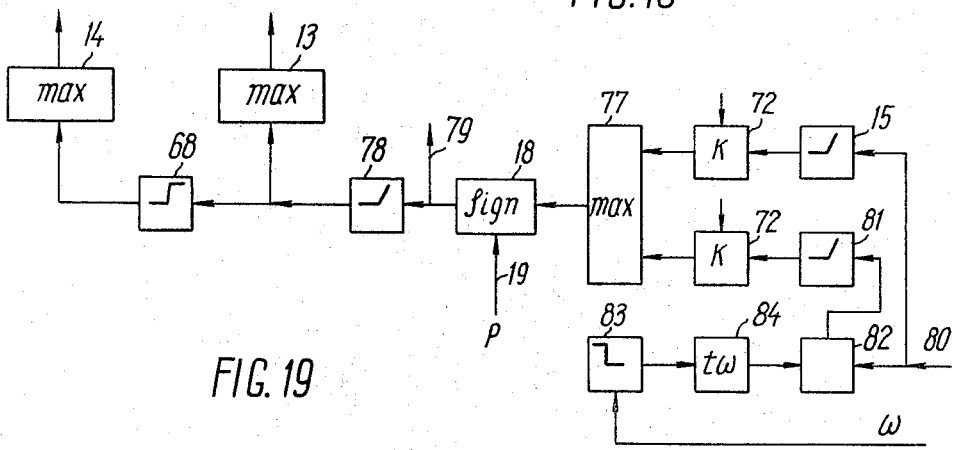
FIG. 19

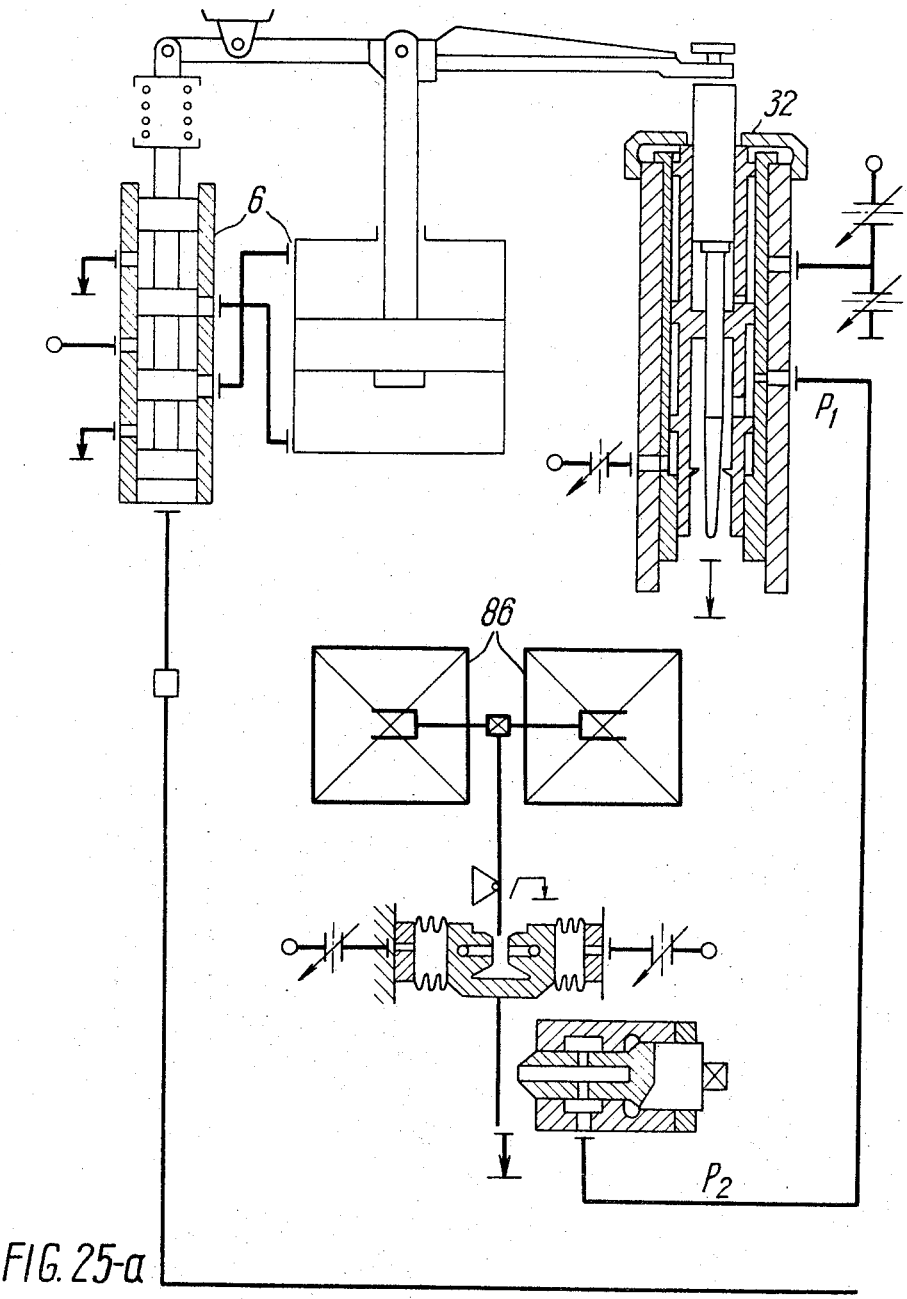
FIG. 25-a

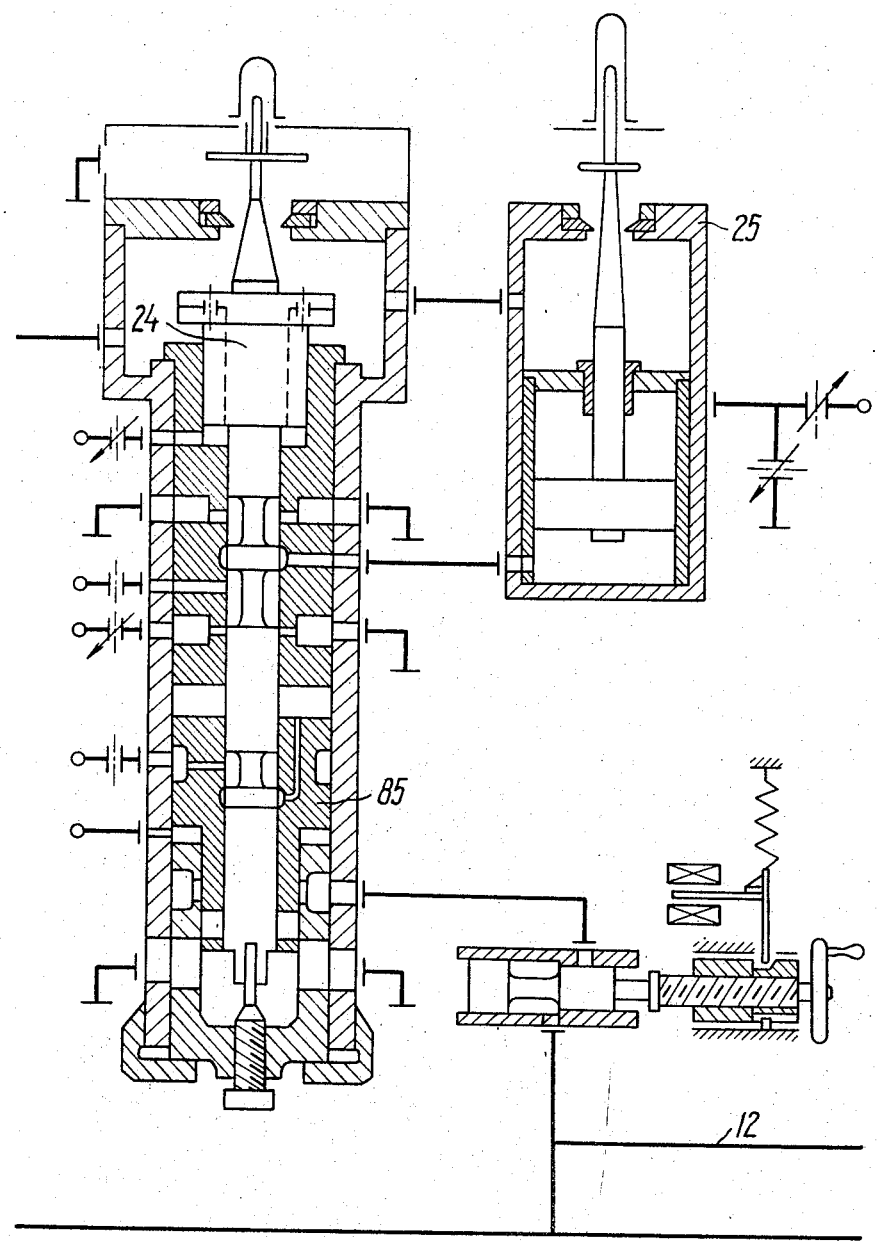
FIG. 25-B

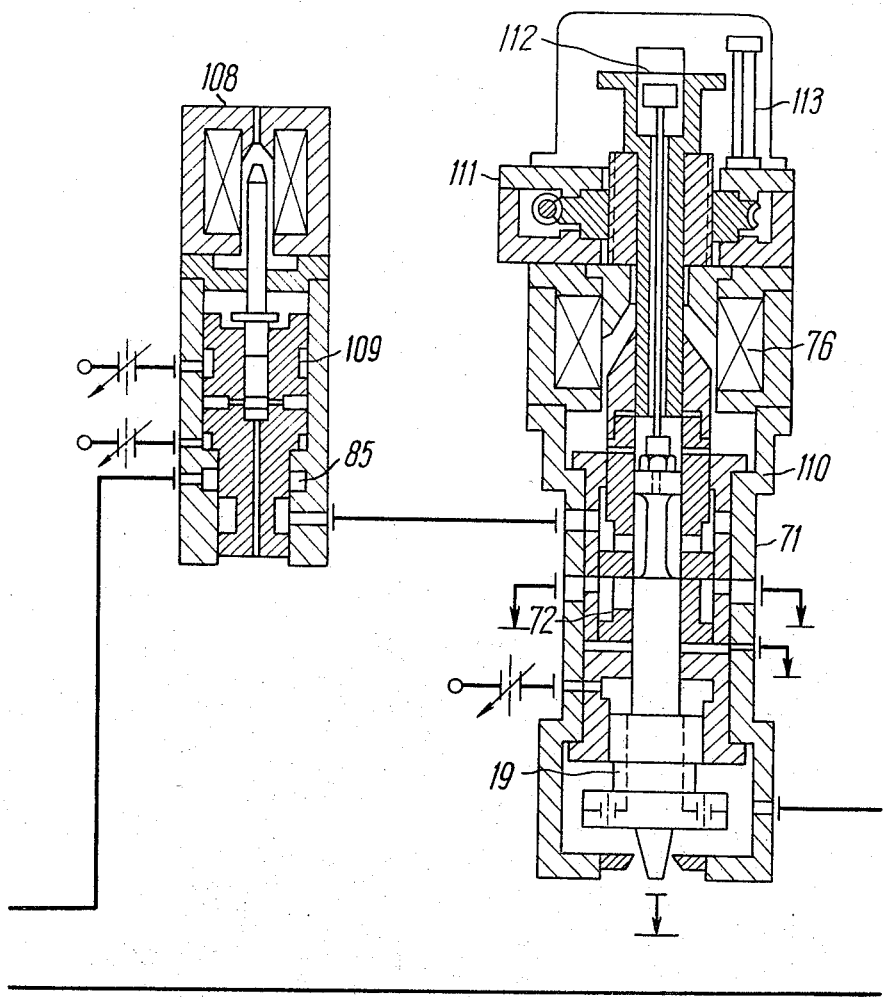
FIG. 25-C

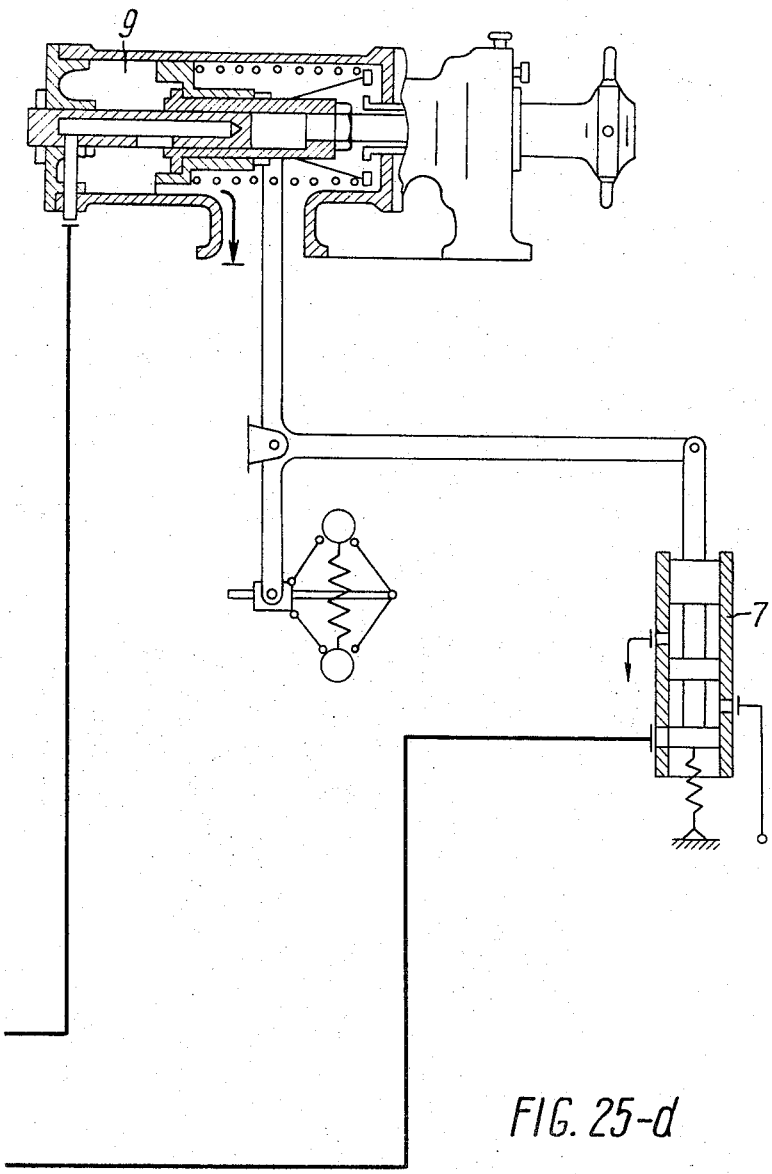
FIG. 25-d

3,421,014
APPARATUS FOR CONTROLLING OPERATION OF TURBOGENERATOR UNDER EMERGENCY CONDITIONS IN THE POWER SYSTEM
Boris Petrovich Moorganov, 2nd Avtozavodsky proyezd, 3a, Apt. 19, Moscow, U.S.S.R.
Continuation-in-part of application Ser. No. 278,928, May 8, 1963. This application Aug. 29, 1967, Ser. No. 664,096
U.S. Cl. 290—40           23 Claims
Int. Cl. H02p 9/04; F02n 11/06

ABSTRACT OF THE DISCLOSURE

A system for carrying out control over the power of the prime mover (turbogenerator) in proportion to a change in the power of the electric generator under emergency conditions, caused by disconnection of the generator from the mains, short-circuiting and other disturbances, as well as limitation of the turbogenerator power down to a permissible value in case the latter is at variance with the turbogenerator current power, resulting from a change in the composition of the operating equipment or non-permissible deviation of the values under control by means of a multi-channel system.

The first group of channels is designed for controlling power under emergency conditions. In this case a signal indicative of the generator power is used for formulating the laws of control, said signal being supplied to a real differentiating link, for instance, an amplifier having an integrating reverse connection with the alternating time constant. Then the signal is supplied to the dead zone controlled by the means for varying said zone in accordance with the signals of changes in the plant operating and emergency conditions. To provide the optimal quality of the transition process, this group of channels employs a signal proportioned to the power of the turbogenerator.

The second group of channels is used to limit the power in accordance with the outer signals. In this case the control signal is supplied to the means for separating the maximum signal and, when acting upon the servomotor of the control valves drive, is substituted with a signal from the synchronizer. The increased precision of the control signals generation is ensured by means of the employment of correcting devices.

---

This application is a continuation-in-part of my application Ser. No. 278,928 filed May 8, 1963.

The present invention relates essentially to protection methods of controlling the power of prime mover serving as drives for alternating current generators operating in parallel with other generators within a power system. In particular, the present invention can most advantageously be used for maintaining in-step operation of the generator under emergency conditions in the power system (short-circuiting, disconnection of power transmission lines), and also to prevent overloads on the various elements of the power plant or maintaining preset operating conditions.

It is generally known that in-step operation of a generator in a power system can be disturbed as a result of the difference in the power received and delivered by the generator shaft due to a sudden change in the generator charactristic, such as short-circuiting. It is also known that in-step operation can be disturbed when the power of the prime mover is at variance with the permissible value determined by the traffic capacity of the transmission lines between the generator and the power system under post-emergency conditions, with one line or branch of line disconnected.

Another generally accepted truth is that to ensure reliable operation of the power system and the main electrical equipment of the power plant—generator and prime mover—constant control is required over certain parameters of the power plant and respective limitations must be made either in accordance with changes in the operating conditions or in terms of the permissible power level.

On the basis of the accepted terminology, the conditions in which stability is maintained during sharp disturbances are herein termed the dynamic stabilty of the generator, and the conditions in which stability is maintained after disconnection of the power transmission lines the static stability in post-emergency conditions.

Until recently, the task of maintaining dynamic stability of the generator was solved by purely electrical methods: disconnection of the faulty portion, operation under initial conditions with a large margin relative to the highest permissible power value, as well as by forced increase of generator excitation, and even disconnection of the generator from the mains upon short-circuits.

At present it can be said that the purely electrical methods of solving this task have been exhausted in large measure, whereas the problem has grown in importance due to unfavourable changes in power plant parameters, with the power of independent power plants rising, and the necessity, in many instances, of transmitting power to considerable distances.

The problem of static stability in post-emergency conditions has so far been also solved by purely electrical methods: disconnection of several generators from the mains upon failure in the transmission lines. As a result, power plants were unnecessarily overloaded, and conditions were created for further emergencies, consumers receiving insufficient power.

Limitations in accordance with generator power have also been made by electrical methods, such as, disconnection of the generators from the power consumers. Overloading of power plant elements has been prevented either by protective means which disconnected the generator or the operation was visually estimated by the operators who unloaded the power plant accordingly (consideration was given to the kinds of overloading which required changes in generated power).

It has been known that one of the efficient methods of maintaining generator stability is to vary the power of the prime mover, a turbine in a specific example, which drives the generator, during operation under an emergency threatening generator stability. In this field research was widely conducted in the United States, the U.S.S.R., and Germany, and the results were published in pertinent journals. In addition, it is accepted that unloading of generator prime movers can, in most cases, produce the desired effect as regards the prevention of loss of static stability in post-emergency conditions and prevention of overloading of the power plant elements. Another known fact is that modern control means, for instance those associated with turbo-plants, are considerably complicated due to the difficulties in preventing shaft overspeeding when the generator is disconnected from the mains, whereas the scope of tasks they are capable of solving is getting narrower, turning control means into pure protection devices serving to prevent overspeeding.

A drawback of the previous proposals made in the way of ensuring generator dynamic stability through control of the prime mover power is the utilisation of discrete-action systems, which are incapable of formulating a control law depending on the type of the emergency situation and the initial conditions. As a result, these devices were only effective for specific kinds of disturbances and certain initial conditions to which they could be adjusted. A similar effect was displayed by discrete-action systems which disconnected the generator from the mains when the power transmission lines were tripped off to ensure static stability in post-emergency conditions, and by protection devices of the power plant, which cut off the generator from the mains when overloading occurred on its elements.

The attempts made to overcome the deficiencies of the discrete-action systems in solving the aforementioned tasks (for instance, control of prime mover power in terms of the coupling angle between the generator and the power system) have not, as far as we know, produced the desired effect in assuring generator stability by means of influence applied to the prime mover. We are not aware of any successful attempts made to combine power control means required for maintaining generator stability with protection against overloading of the power plant elements, for instance, turbine.

The object of the present system is to give protection to a power plant comprising a generator supplying a power system and having any prime mover, most frequently a turbine, against actions disturbing its stable operation in the power system in case of various kinds of faults, to prevent unacceptable overloading of various elements of the power plant, which might lead to damage or premature wear of these elements, the maintenance of generator stable operation in the power system and reliable functioning of all equipment being assured by a common multi-channel system, the individual channels of which have common design features.

Unlike the known discrete-action systems controlling the prime mover power for improving the dynamic stability of the generator, which—under emergency conditions—disconnected the generator or a group of generators from the mains, or displayed a preset, one-time action (the duration of which is generally preset) on the control valves of the prime mover, the present system is capable of controlling the power of the prime mover proportionally to the fault developed and can be automatically adjusted depending on the initial, pre-emergency condition of the power plant, and also depending on the coupling between the generator and the power system. The formulation of control laws in accordance with various control signals also expands the capabilities of the proposed system in overcoming emergency situations occurring in the power system and in the power plant.

In view of the above, the object of the present invention is to create a system for controlling the power of a prime mover serving as the power drive of an alternating current synchronous generator, so as to improve the dynamic stability of the generator, i.e. to prevent disturbances of in-step operation during short-circuiting in the power system, the control signals being shaped depending on the type of disturbance and being determined by the initial condition of the power plant and the power system, and the operational requirements. The proposed system acts on the actuating mechanisms of the prime mover valves and at the same time controls the shaft speed governor generally provided on any power plant.

It has been established during tests of industrial devices under realistic emergency conditions within a power system that the use of the present system allows the level of transmitted power under dynamic stable conditions to be raised by 30 to 70 percent without sacrificing reliability in operation.

Another object of the present invention is to provide modern high-power A.C. turbogenerators with quick-action additional protection against shaft overspeeding, which adversely affects the maintenance of generator in-step operation. It is known that additional signals indicative of rotor acceleration are likely to affect the maintenance of generator stability.

Industrial tests show that the present system, in conjunction with a shaft speed governor, is capable of reducing shaft overspeeding down to 4 or 5 percent, a value close to static speed increase in accordance with the turbine control characteristic, instead of the common 7–9 percent for the static irregularity in speed control equal to about 5 percent.

And still another object of the present invention is to prevent disconnection of the generator from the mains upon disconnection of the power transmission lines in order to maintain the static stability of the generator in post-emergency conditions. The unloading of the turbogenerator with the help of the proposed system to a preset value which can be varied in response to variations in the aspect of the coupling between the generator and the power system allows undesirable disconnection of the generator to be prevented and the reliability of the power plant equipment to be enhanced in operation. In addition, it allows the standby power of the power system to be increased owing to the maintenance of the generators in the power system, and also owing to the power being dropped only to the desired level to maintain stability in post-emergency conditions.

Industrial tests show that the present system is capable of maintaining stable operation of the generator when it is only unloaded to the static stability level in post-emergency conditions.

A further object of the present system is to restore the normal shaft rotation speed following generator disconnection from the mains so as to prepare the generator for subsequent connection to the power system as soon as possible, thereby reducing shaft overspeeding. We have found by tests that this part of the system allows to develop practically the rated speed of rotation after generator disconnection from the mains and to connect the generator to the power system without additional adjustment by the rough synchronization method.

A still further object of the present system is to control the various coordinates of the turbogenerator, or in a more general sense the generator and its prime mover, as well as to limit turbine power when the coordinates exceed the permissible operating levels. In particular, one part of the system serves to formulate the law of fast changes in the power in order to maintain the dynamic stability of the generator, thereby preventing impermissible rate of power rise.

It is also among the objects of the present invention to increase the rotational standby power of the power system owing to a partial lift on the power rise limitations for a given time when the power system frequency drops below the permissible preset value.

It is yet another object of the present invention to unload the prime mover in accordance with the power required by the power plant of which the prime mover is the power drive. In this manner it is possible to control the power of a ship engine in accordance with the shaft power transmitted to the screw in stormy weather, when the power tends to vary periodically. The primary motor of a D.C. generator can be controlled depending on the power delivered by the generator into the mains, i.e. the power system.

In other terms, the present invention is adapted to control the power of a prime mover (specifically, a turbine) of an A.C. generator depending on the power system requirements and at the same time to satisfy power control requirements associated with the necessity of frequency control in the power system, protection from shaft overspeeding, and prevention of overloading of power plant elements when the power is controled in accordance with laws established by the power system. The purely protective part of the system, preventing overloading of the elements, can also be used to give protection upon deviations of thermal engineering and electro-engineering coordinates of the power plant, thereby widening the possibilities of the proposed system.

In one embodiment of the present invention, the system for controlling the prime mover power comprises means for recording the unbalance of the prime mover power and the power delivered by the generator to the power system under an emergency situation created by a short circuit. As this means operates, the system produces a control command in proportion to the resulting unbalance.

A provision is made for means preventing the possibility of a control command appearing when the power unbalance is small.

A provision is also made for variations to be made in the preset value of unbalance between the prime mover power and generated power when the control command is produced in case of increased shaft rotation, direction of shaft acceleration, initial generator power, generation of a control command, duration of emergency period, and also from external control devices which are not connected with the present system. In addition, we make use of means ensuring quick-acting of the present system for varying the power of the prime mover at the fastest possible speed.

To enable the system to perform its protective functions upon disconnection of the power transmission lines or to prevent overloading of the power plant elements in the event of short-circuits and under normal operating conditions, we provide for means detecting the deviation of the controllable coordinates from the preset permissible values. As these means operate, the system produces a signal proportional to the positive difference between the available and preset values of a specific coordinate (in a specific case, this signal can be produced by a relay).

Besides, the system comprises means for varying the permissible level of the signal depending on the power developed by the unit, and also depending on the values of the other coordinates which predetermine the permissible level of the controllable coordinate.

We have also provided for means eliminating the discrepancy between the position of the power setter (synchroniser) and the actual value of the plant power which is established as a result of the operation of the aforesaid protective part of the system. Said means assures the transfer of the synchroniser to a new position corresponding to the power value established by the operation of the system. The power of the power plant remains at the level established as a result of the action of the proposed system.

Coordinated operation of the various channels of the present multi-channel system is ensured by means which distinguish the maximum signal value from various control channels, said signal being transmitted to the servomotor drives of the control valves, in a specific embodiment a turbine with a power setter for controlling shaft speed (synchroniser). Depending on the desired quick-acting and required laws, there is a possibility for the system to simultaneously influence the power drive of the control valves and the power setter (synchroniser) and either the valve power drive or the synchroniser alone.

To allow the system to function efficiently, we also provide independent pick-ups used for producing control commands.

In accordance with the above and other objects, the present invention consists in a new system and a combination of its individual parts and groups of parts, which is below described and presented in claims. Various embodiments can be made within the scope of the invention described herein and set forth in the claims without departing from the spirit of the invention.

Other purposes and advantages of the invention will become apparent from the following disclosure and the accompanying drawings, in which:

FIGURE 1 is a schematic diagram of the turbogenerator operating in a power system and having a shaft speed governor and a multi-channel system according to the present invention, which acts with the help of the first group of channels on the drive of the turbine control valves, two parts of the second group of channels acting simultaneously on the valve drive and the power setter (synchroniser) and on the synchroniser alone.

FIGURE 8 is a schematic diagram of the means for shaping a feed-back signal indicative of steam pressure in turbine stages with means for shaping primary control signals (variant B).

FIGURE 9 shows a variant of connection of the means for varying the proportion factor of the primary control signal of the first group of control channels of the proposed system.

FIGURE 10, the same.

FIGURE 11 is a schematic diagram of the means for varying the dead zone of the first group of control channels depending on shaft speed.

FIGURE 12 is a schematic diagram of the means for varying the dead zone of the first group of control channels depending on changes in shaft speed and its derivative, on the preset power value in the initial conditions, duration of disturbance period, operation of the channel group and the external signal.

Figure 13:
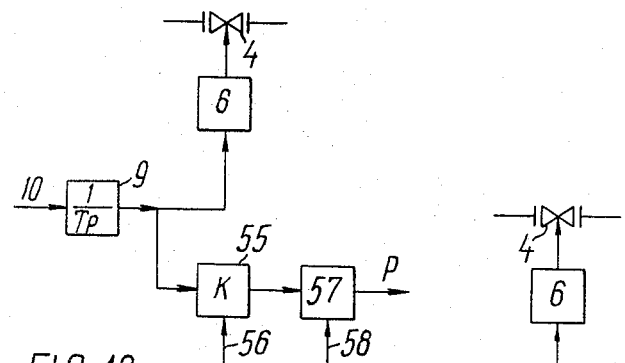

FIGURE 13 is a schematic diagram of the means for shaping a signal proportional to the preset power of the prime mover with a power setter (synchroniser).

Figure 14:
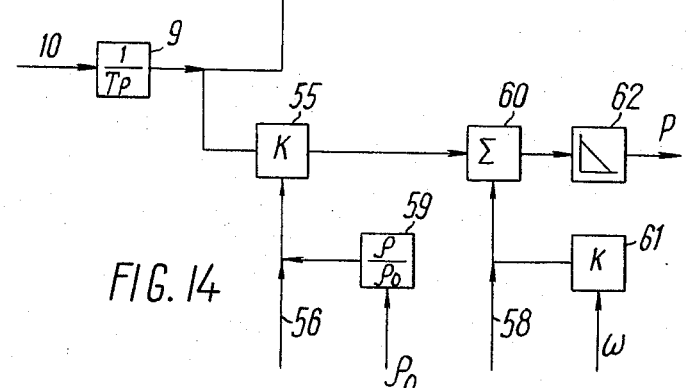

FIGURE 14 is a schematic diagram of the means for shaping a signal proportional to the preset power of the prime mover with a power setter and correcting means responsive to variations in power supply to the prime mover (for a steam turbine, steam pressure in front of the turbine) and to the shaft speed.

Figure 15:
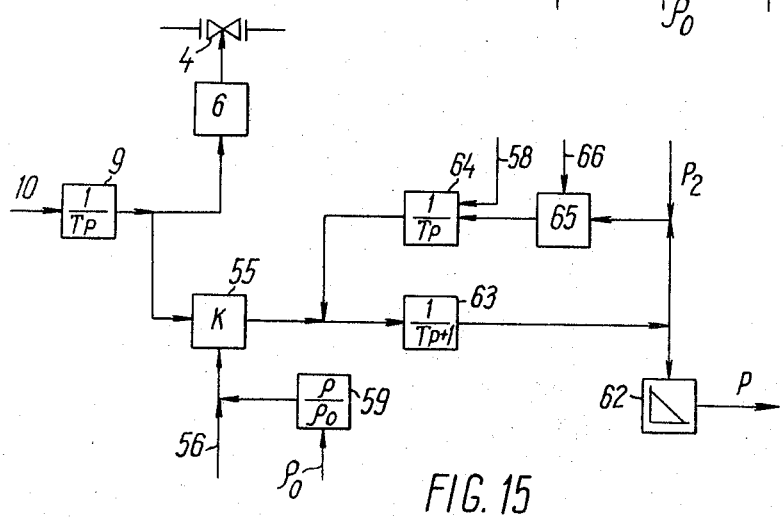

FIGURE 15, the same as FIGURE 14, with a correcting cut-off device responsive to the generated power in place of the correcting device sensitive to shaft speed.

Figure 16:
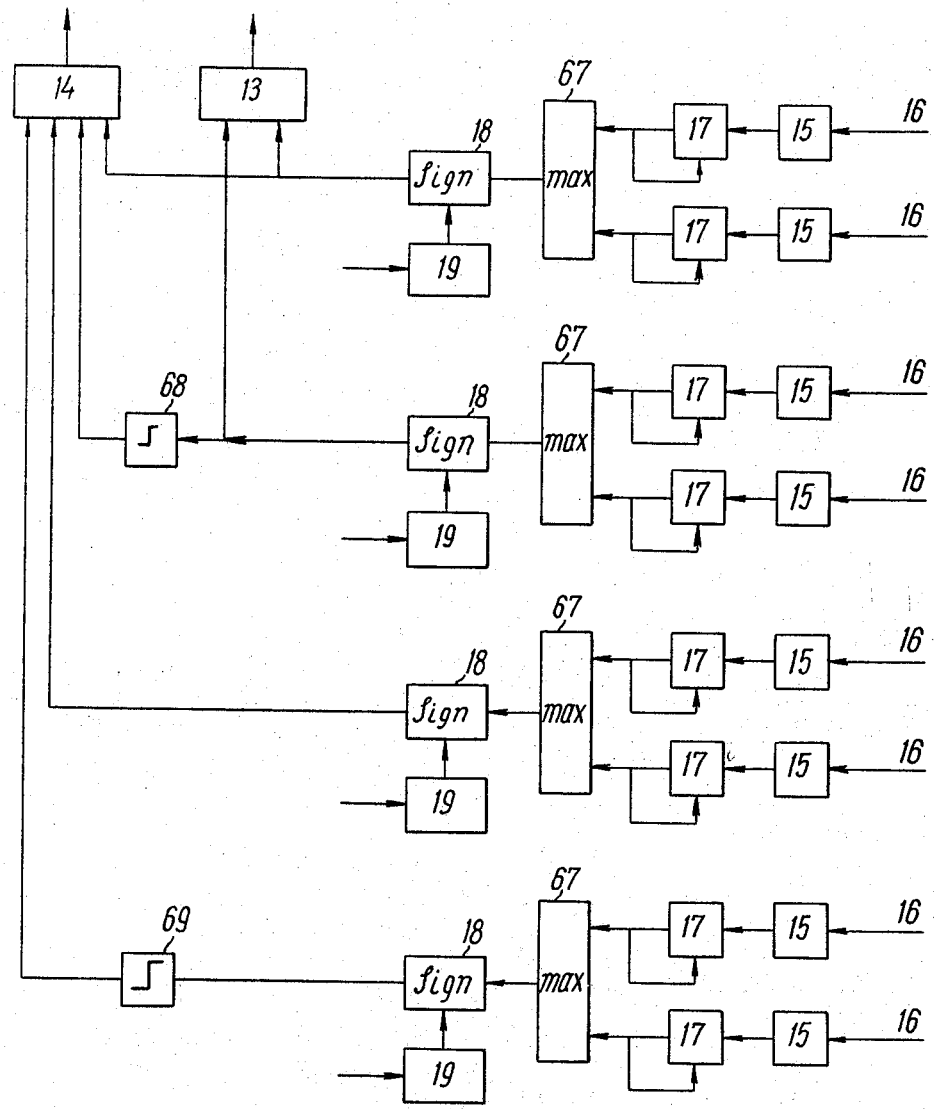

FIGURE 16 is a schematic diagram of the second group of the control channels with common means for creating a dead zone for individual sub-groups of channels and relay elements for controlling the power setter (synchroniser).

FIGURE 17 is a schematic diagram of variant A of the means for producing a primary control signal of the second group of control channels in the present system.

FIGURE 18 is a schematic diagram of variant B of the means for producing a primary control signal of the second group of control channels in the present system with common means for creating a dead zone for sub-groups of channels.

FIGURE 19 is a schematic diagram of variant B of the means for producing a primary control signal of the second group of control channels with a common means for creating a dead zone, means for creating a signal interdicting power rise and means for removing limitations when the frequency drops in the power system.

Figure 3:
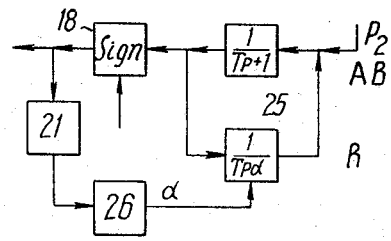
FIGURE 3 is a schematic diagram of variant B of the means for shaping primary control signals of the first group of control channels of the proposed system.
Figure 20:
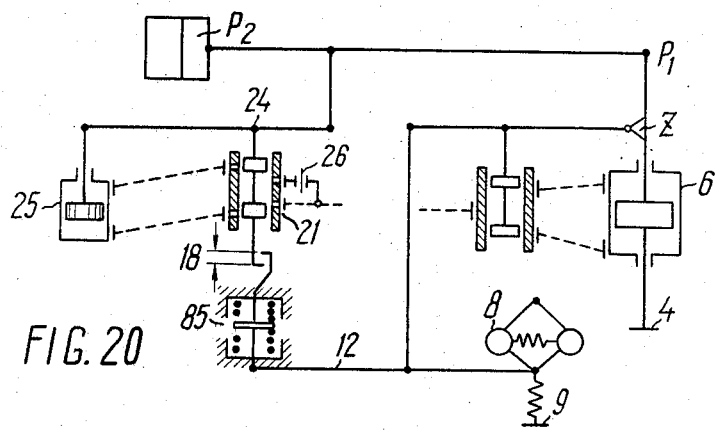

FIGURE 20 is a block diagram of the first group of control channels of the hydro-mechanical variant of the present system with means for producing primary control signals according to variant B in FIG. 3.

Figure 5:
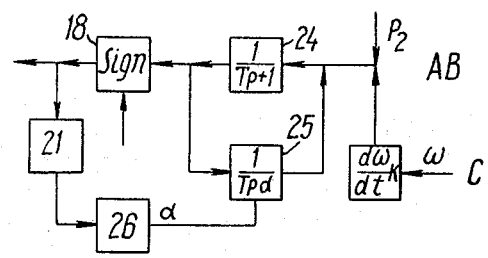
FIGURE 5 is a schematic diagram of variant B of the means for shaping primary control signals of the first group of control channels and an additional signal proportional to the derivative of the shaft speed.
Figure 21:
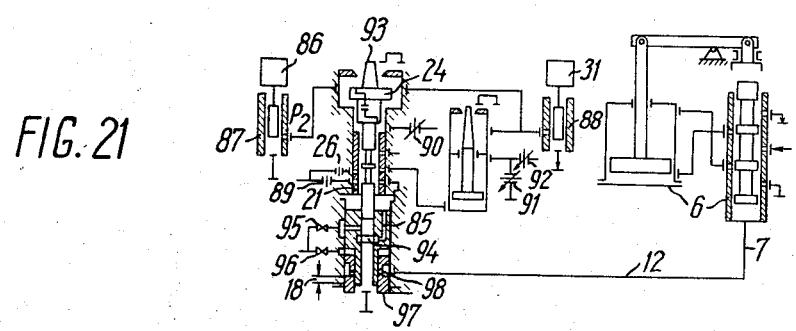

FIGURE 21 is a block diagram of the first group of the control channels of the hydraulic variant of the present system, shaping an additional signal proportional to the rotor acceleration with means for producing primary control signals constructed in accordance with variant B in FIG. 5.

Figure 22:
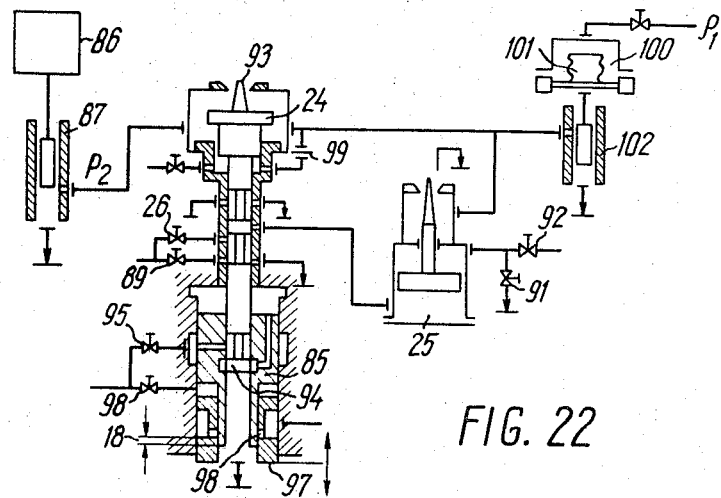

FIGURE 22 is a block diagram of the first group of the control channels of the hydraulic variant of the present system with prime mover power feedback relative to steam pressure in turbine stages and variant B of the means for shaping a primary control signal in accordance with FIG. 8.

Figure 23:
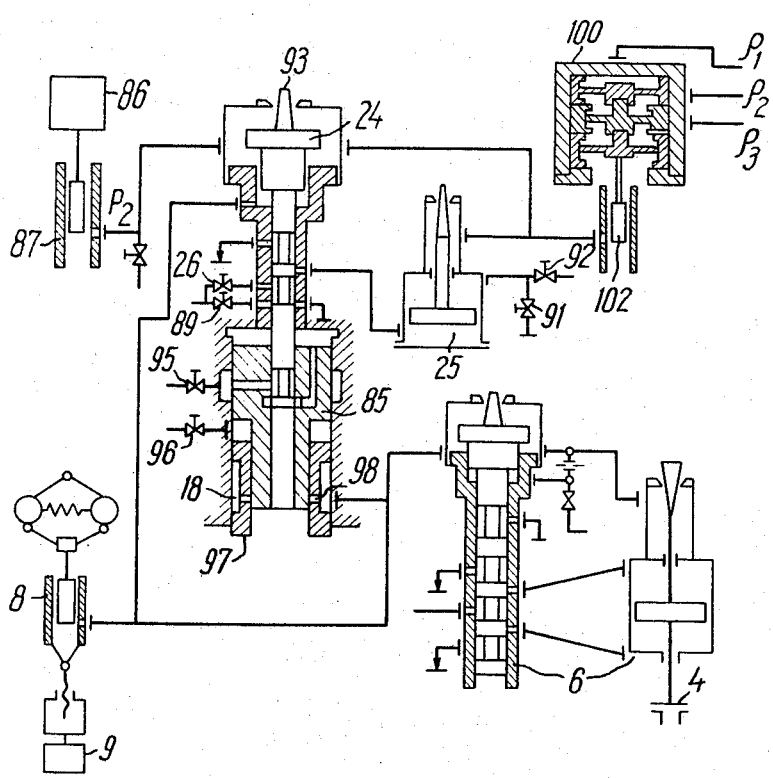

FIGURE 23 is a block diagram of the first group of control channels with a prime mover power feedback relative to steam pressure in turbine stages and a dead zone variable in dependence of the shaft speed.

Figure 24:
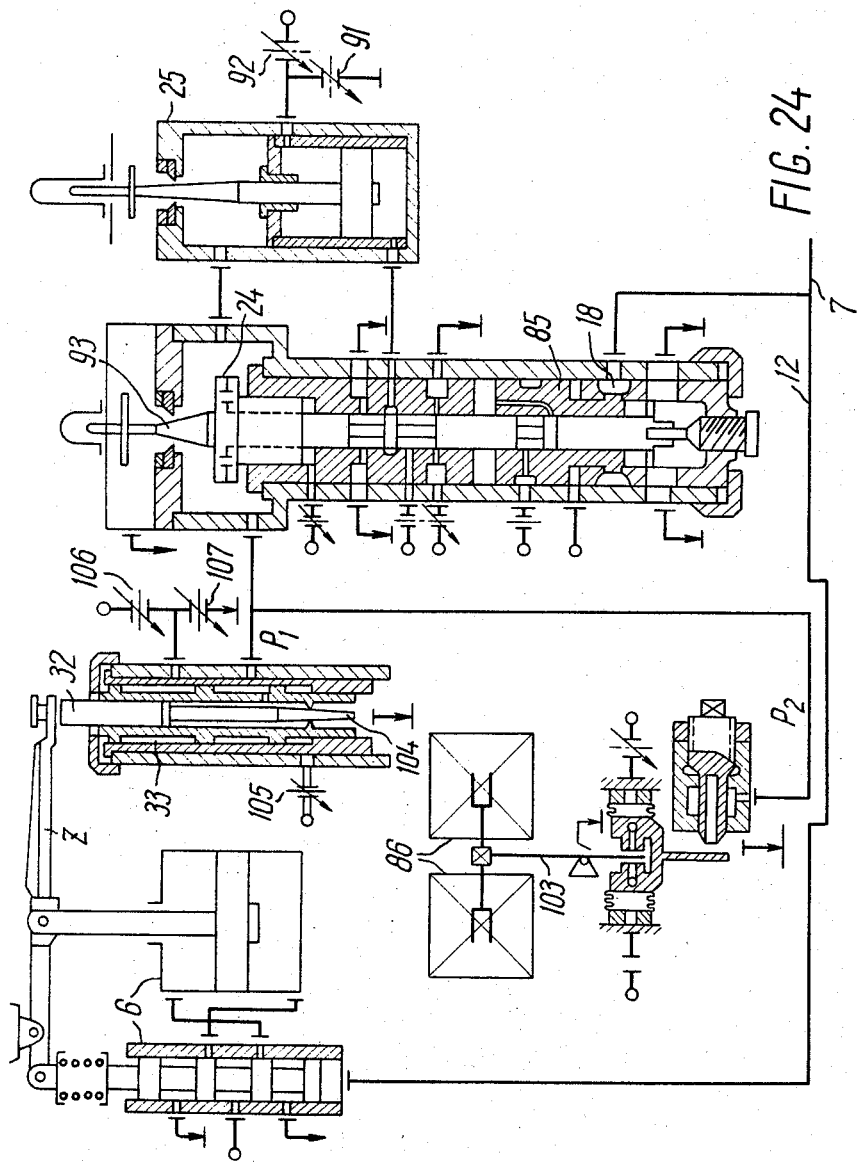

FIGURE 24 is a block diagram of the first group of control channels of the hydraulic variant with a feedback for the position of the control valve drive with variant B of the means for producing a primary control signal.

Figure 27:
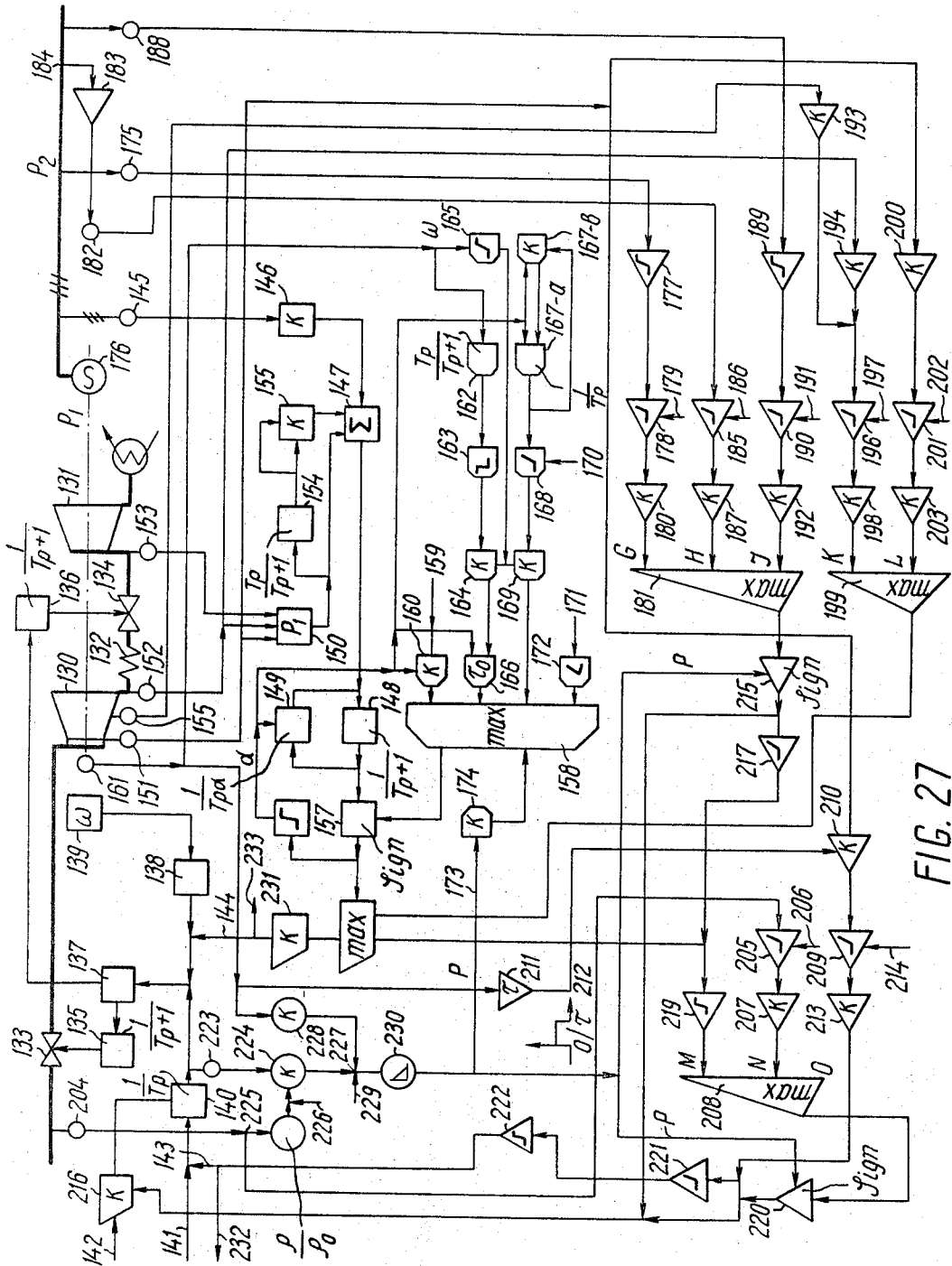

FIGURES 25a–25d are a block diagram of the first group of control channels similar to those shown in FIGURE 27, and the second group of control channels operated by pick-ups of discrete output signals.

Figure 26:
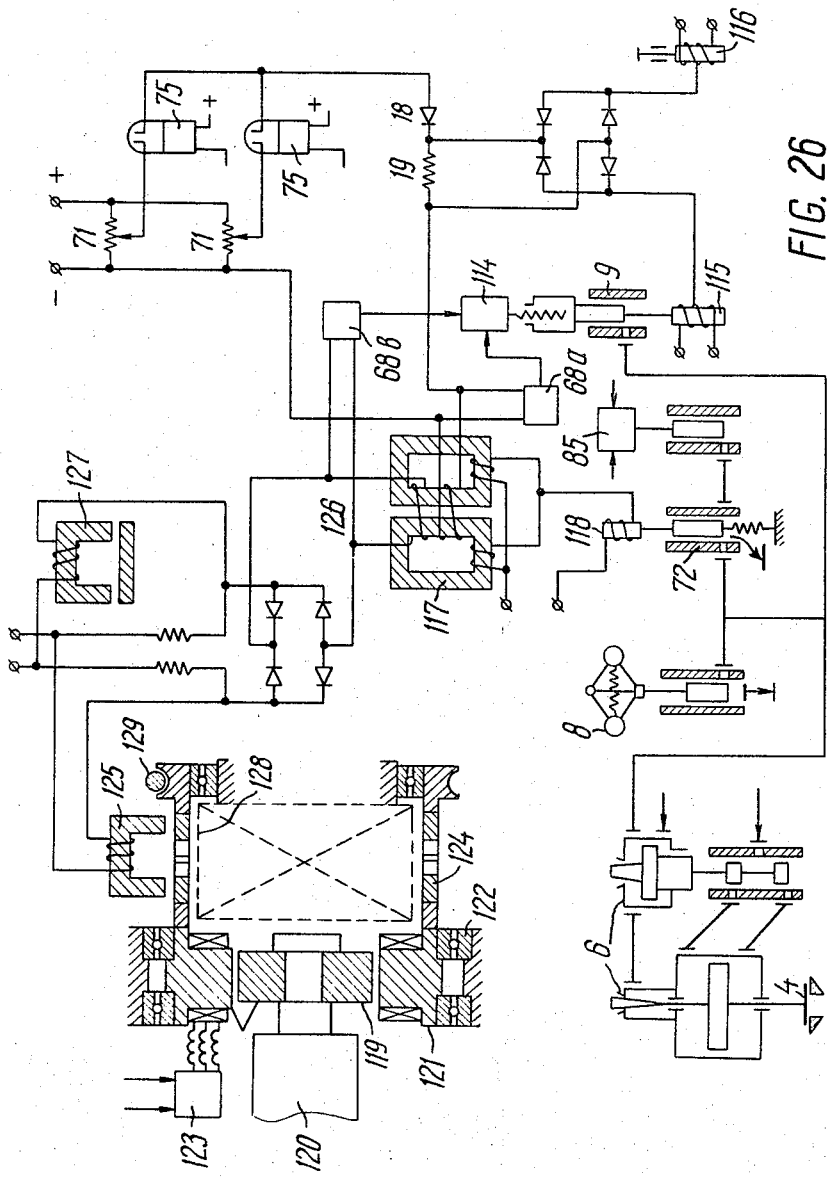

FIGURE 26 is a block diagram showing, in addition to prime mover control, the output amplifier of the first group of control signals and the second group of control channels with an additional pick-up for controlling the coupling angle valve between the generator and the power system.

FIGURE 27 is a block diagram comprising a generator, a turbine with intermediate steam superheating, turbine controls and any of the embodiments of the proposed system comprising the means and devices described herein.

To facilitate the understanding of the present invention, we describe below a power plant, to control whose power use can be made of the proposed system, though we have stated above that this is not the exclusive use of the present invention.

Figure 1:
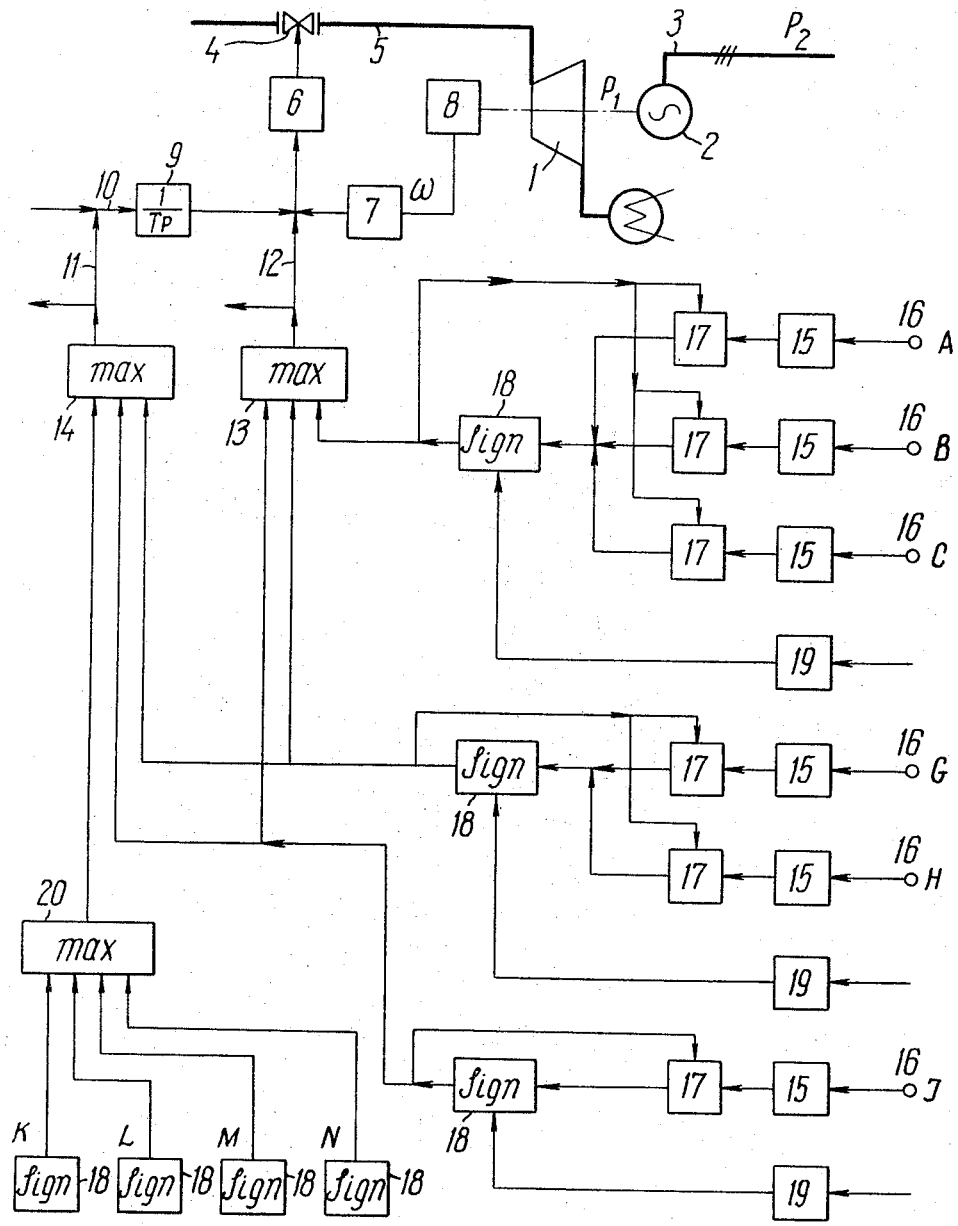

Referring to FIGURE 1, the prime mover 1, a turbine in a specific case, for instance, a turbine with intermediate steam superheating, transfers its energy to a synchronous generator 2, which in turn transmits generated power P2 to the power system with the help of power transmission lines 3. The commutation circuit of the generator is not described, though its condition—connection and disconnection of transmission lines, loading of lines, current value in the lines, transformer heating and other coordinates—can be used for formulating laws according to which the power can be controlled with the help of the proposed system. For the sake of simplicity, FIGURE 1 illustrates only one power plant, whereas it will be understood that the present system can be used with some or all units of a power station or even the power system.

The prime mover (a turbine diagrammatically shown in FIG. 1) has control valves 4 which allow variations in the motor power (for intermediate superheated steam turbines there are several valves of this type, while for other types of prime movers use can be made of a fuel pump, or a throttle) by varying energy delivered through piping 5 (engineering elements are shown in thick lines).

The control valves have drives 6 (hydraulic, electro-mechanical or any other suitable type), the position of which, and by implication of the valves to which they are connected, is governed by the value of the signal supplied to their input, i.e. in nature they are static inertial elements. If several control valves are involved, the control signal is supplied through means ensuring the required succession of opening of these valves.

In general, the drives of the prime mover valves are controlled with the help of the shaft speed control system comprising a speed pickup (governor) 8, and also by changes in the setting made with the help of a power setter (synchronizer) 9. The control system is normally of static type, and the synchronizer is of integrating type, i.e. the synchronizer effects changes in the signal at its output until the signal at its control input 10 is zero. The drive of the control valve 6 and the power setter 6 can be supplied with additional control signals from external systems through inputs designated as 11 and 12. The inputs 11 and 12 are used in our multi-channel control system.

The turbine, or a prime mover in general, as well as the generator and other equipment are usually provided with a series of pickups which control the various coordinates or the state of the power plant (pressure before the turbine, pressure drops on the diaphragm, relative expansion of the rotors, vibration, temperatures, pressure of hydrogen cooling the generator, current values, etc.). The pickups are not shown in the diagram but our system is capable of receiving their signals.

*Description of the general structure of the prime mover power control system*

The complete structure of the prime mover control system is shown in FIGURE 1. To solve the task facing the applicants it is necesary to control a large number of coordinates, the changes in which could enable the present system to apply various control actions to the power of the prime mover so as to provide efficient control in various situations. This explains the provision for multiple channels in the present control system, i.e. division of the system into separate combinations of devices and means connected in parallel and having similar design. These combinations are assembled in separate groups depending on the type of control to be applied to the control valve drive.

The present system controls the drive of the control valves either directly through input 12 or through the power setter (synchronizer), or input 11. The present control system can be divided into two channel groups depending on the types of control action applied to the valve drive and in accordance with some features of the structure which is considered below.

The first group of channels acts directly on drive of control valves 6, and the second group acts directly on the drive of control valves 6 and through power setter 9. For further consideration the individual channels of the first group of the control channels are designated by the capital letters, A, B, C, D, E, F, G, and the channels of the second group are identified by the subsequent letters starting with H. Therefore, in FIGURE 1 showing only part of the channels of both groups, the alphabetic order is mixed.

To avoid addition of the signals from separate channels or groups of channels, the system comprises two devices for separating the maximum control signal, said devices being connected to the inputs of the drives of valves 6 and setter 9. The input of the first means 13 for separating the maximum signal is connected to all channels or groups which require rapid changes to be made in the power by direct changes in the positions of the drive servomotors. The input of the second means for separating the maximum signal is connected with all channels or groups requiring slow changes to be made in the power with the help of the power setter (synchronizer) from the output of means 13 and 14. It is possible to use information signals which are utilised to control other pieces of equipment, such as the boiler driving the turbine (designated by arrows in the drawings).

The first group of control channels comprising channels A, B, C, D and E (not all channels are shown in the diagram) apply action directly to the drive of the control valves 6 via means 13, and the layout of this group is construed to assure its quick-action in response to variations in the generated power under emergency conditions in the power plant.

The second group of channels comprising channels H,

J, etc., ensures rapid changes in the prime mover power by influencing the control valves directly through the drive (servomotor) 6 and slow changes by influencing the power setter (synchroniser) 9. The second group has distinctive features owing to which it works out laws for limiting power upon deviations of the controlled coordinates from the permissible values. In some instances, this channel group is capable of influencing synchroniser 9 alone. But its desing features being the same as for simultaneous action, its separation into an independent group seems unreasonable. Thus, the separation of the multi-channel system into groups as above allows the individual features of the present system to be defined with higher accuracy. This separation is due to the fact that although the present system yields the highest efficiency in conjunction with the whole complex of devices, in some cases the first and second groups of channels can be used separately.

Although the channel groups are used to formulate different laws, they have common structural features owing to the protection functions performed by the present system, as was stated above.

On principle, each control channel has means for forming primary control signals which are used to convert the signals supplied by the pick-ups monitoring the state of the elements and deviations of the coordinates into a control command. As will be explained below, the first group of channels serves to form primary control signals depending on the signals which indicate, directly or indirectly, the relation between the generated power and the power of the prime mover.

The means for forming primary control signals in the second channel group serves to detect deviations of the signals from various pick-ups from the permissible operating value, and after unloading the prime mover it automatically disconnects the channel without altering the prime mover power established under the influence of the respective control channel.

In the first group of channels, and occasionally in the second group as well, to achieve the desired quick-action or accuracy, the signal from the means forming primary signals can partially or wholly be compensated for by the signal of the feedback means. Feedback means can be designed similarly to means forming primary signals (separation is preferred for purposes of simplicity in description). In FIGURE 1, the means for forming primary signals and the feedback means are designated as 15, with pick-ups or input signals 16.

The signals arriving from the separate means for forming primary signals and from the feedback means are metered with the help of a means 17 for varying the proportion factor (gain factor) in the respective channel, which supplies a signal to effect a respective variation depending on the level of the signal at the output of the channel groups or of an individual channel. As a result, owing to the means for varying the proportion factor (designated similarly for the first and second channel groups as 17) changes are effected not only in the linearity of the control channels but also in their structure depending on the type of action performed by the channel.

Each control channel or channel group is provided at the output with means 18 for creating a variable dead zone, which admits to the output only those signals which exceed the preset amplitude value. The value of the dead zone is either preset in advance during system adjustment or is varied automatically upon changes in the operating conditions of the generator in the power system, and also in relation to the other coordinates which predetermine the required pattern of action. Variations in the dead zone are effeced with the help of the means for varying the dead zone, designated as 19.

In some instances, similar control channels of the second group should—for purposes of simplicity—be divided into separate subgroups and provided with individual means for separating the maximum signal from several parallel control channels. FIGURE 1 shows one of such subgroups with a common means 20 for separating the maximum control signal.

The description of the design of the multi-channel control system shown in FIGURE 1 does not cover all its features and should only be considered as indicative of the location of the individual elements of the claimed system, which are considered below in various embodiments of each channel group.

The following description deals with the features of the possible embodiments and a specific embodiment of the system for the channels of the first and second groups.

*Features of the first group of control channels of the present system*

The first group of control channels is used mainly for protecting the generator from disturbances in its synchronous operation at failures in the power system due to short-circuiting. As regards its functions, this group of channels serves as a protection governor ensuring agreement between the power of the prime mover and the generated power delivered to the power system. The pattern of action displayed by the first channel group, i.e. the control functions of the systems, is determined by pickups which supply their signals to means forming primary signals, feedback means, for varying the dead zone, as well as change the proportion factor (gain factor) in individual channels.

The protective functions of the system are due to the means for creating a variable dead zone and means for varying the dead zone and proportion factor of the means for forming primary control signals, which alter the structure or level of action shown by the system in normal and emergency operation.

Below we consider the construction and features of the means associated with the first group of control channels.

Means for forming a primary control signal and feedback means are used to convert signals received from the pickups which alter, directly or indirectly, the generated power and the power of the prime mover, into signals which are proportioned by other means of the system to obtain an optimum pattern of action applied to the drive of the control valves.

The desired control law can be obtained with the use of various signals from the pickups and with the help of various embodiments of the means for forming primary control signals. We have used three embodiments of this means, which can also be embodied in a number of additional variants.

Figure 2:
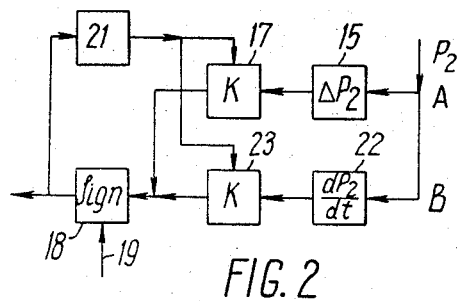
FIGURE 2 is a schematic diagram of variant A of the means for shaping primary control signals of the first group of control channels of the proposed system.

FIGURE 2 shows a means for forming a primary control signal with the use of the signals from a pick-up measuring the generated active power P2 and sending its signal to two channels A, B. Means 15 for forming a primary signal in channel A is used to measure the increment of the power relative to the initial state, and its signal grows owing to the increase in the gain factor as a signal appears after the dead zone 18 of the given group of channels, said signal being recorded by relay 21 with the help of means 17 for varying the proportion factor.

The second channel B differentiates in time the value of P2 with the help of the means 22 for forming a primary control signal, whose influence diminishes as the channel is operated by the means 23 for varying the proportion factor. As a result, small and slow changes in P2 cause the dead zone 18 to prevent passage of the signal to the channel output, whereas in response to a considerable change P2 or development of $dP2/dt$ exceeding the dead zone 18, the signal passes to the output and the relation between P2 and $dP2/dt$ alters at the same time, ensuring power changes in proportion to P2, while the overcoming of the dead zone is proportioned to $dP2/dt$.

In this manner, the system is not subjected to any influence at small deviations of P2 within the range of normal operating conditions, and the adverse effect of the dead zone is eliminated in transition to control in an emergency situation at the expense of $dP2/dt$, the power being controlled in proportion to P2 owing to an increase in the gain factor of the channel P2 and a decrease in the gain factor of the channel $dP2/dt$. In practical terms this law can also be achieved with the help of a circuit comprising a common means containing an integrating and compensating amplifier.

FIGURE 3 illustrates a circuit for forming a primary control signal, comprising common means for both channels A and B, with the help of a signal, proportioned to the generated power P2, and an integrating amplifier. The signal proportioned to the generated power P2 is directed to the input of quick-acting amplifier 24 which is comprised by integrating amplifier 25. As a signal appears at the output of the channels after the dead zone 18, it operates relay 21, and the means 26 for varying the proportion factor produces a signal which decreases the gain factor of integrating amplifier 25, i.e. increases its time constant. As a result, in the event of small changes in P2 observed under normal operating conditions the control signal does not pass beyond the dead zone 18, since the influence of the integrating amplifier 25 compensates for the signal possessing a small time constant. When a failure develops, with the changes in the generated power exceeding the preset value, the control signal passes beyond the dead zone, thus causing a simultaneous rise in the time constant of the integrating amplifier 25 and allowing the power to be controlled in proportion to the variation P2 (it should be noted that the combination of the amplifiers 24 and 25, the latter having small time constants, makes it possible to obtain a transmission function $Tp/Tp+1$, while with large time constants the transmission function has an approximate aspect $1/Tp+1$).

Figure 4:
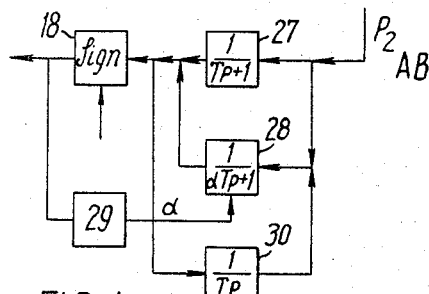
FIGURE 4 is a schematic diagram of variant C of the means for shaping primary control signals of the first group of control channels of the proposed system.

A similar result can be obtained with the use of a common means for forming a primary control signal in both channels, A and B, with the help of a compensating amplifier having a variable time constant, as illustrated in FIGURE 4.

In this case, the signal proportioned to the generated power is directed to two amplifiers 27 and 28 having identical gain factors, the signal from the amplifier 28 being subtracted from the signal across the amplifier 27. Due to this, under normal operating conditions the signal before the dead zone 18 does not exceed the preset level owing to the smallness of the difference between the time constants of amplifiers 27 and 28. As a signal appears across the channel output, the means 29 for varying the proportion factor produces a signal, which raised the time constant of amplifier 28, owing to which fact compensation in terms of the time of emergency practically stops (emergency lasts for less than 1 second), thus assuring control in proportion to changes P2. To prevent unwanted variations in the gain factor of amplifiers 27 and 28, which is likely to lead to accumulation of error and disturbances in circuit operation, both amplifiers can be embraced by an additional integrating amplifier 30, whose time constant is chosen substantially larger than that of amplifier 27.

The integrating amplifier is connected to the input of amplifier 27 or 28 and slowly eliminates the unbalance at the output of these amplifiers, without practically influencing the transient process during failures. Provided that the stability of the gain factors of amplifiers 27 and 28 is ensured, integrating amplifier 30 is not required to be connected in the circuit.

The high efficiency required in the control of the prime mover power for eliminating the failure in the power system presupposes high quick-acting of the first group of control channels. One of the ways to enhance the quick-action is to utilise an additional signal proportional to the acceleration of the generator rotor. In this case (see FIGURE 5), in addition to the signal proportional to the generated power utilised for producing commands in channels A and B, the channel C is supplied with a signal proportional to the shaft rotation speed which is converted in converter 31 into a signal proportional to acceleration.

The signal proportional to acceleration is added up to the signal proportioned to the generated power and is then sent to the circuit for additional shaping of the signal, this circuit being similar to those illustrated in FIGURES 2, 3 and 4. In FIGURE 5, the circuit producing an additional acceleration signal is illustrated in connection with the variant of the means for forming a primary signal, comprising an integrating feedback, as in FIGURE 3, and has the same reference numerals. The pulse proportional to rotor acceleration can obviously be used in the embodiments of the structural diagrams illustrated in FIGURES 2 and 4.

High quick-action of the first group of control channels can also be achieved with the help of a feedback proportional to the power P1 maintained by the prime mover. Depending on the setting, the feedback whose signal is proportioned to the turbine power, can partially or fully compensate for the signal proportional to the generated power (P2–P1). As a result, under normal operating conditions, when the possible disagreement between the turbine power and the generated power is insubstantial, the control system functions as described above. On the other hand, under emergency conditions, when the generated power sharply changes, the control pulse increases in value, thus making possible, first, a forced action to be applied on the valve drive and, second, the adverse effect of the dead zone on the transient process to be reduced to the minimum.

Figure 6:
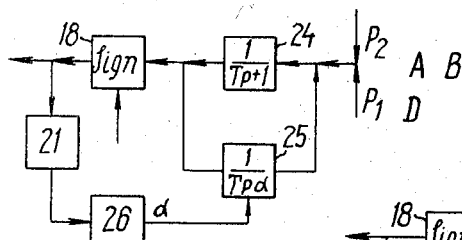
FIGURE 6 is a schematic diagram of variant B of the means for shaping primary control signals of the first group of control channels with a turbine power feedback.

FIGURE 6 illustrates the diagram of the first group of control channels, comprising channels A and B which display action in proportion to changes in the generated power and time derivatives of these changes, and channel D of the feedback of prime mover power P1. The diagram is in association with variant B of the means for forming a primary control signal, illustrated in FIGURE 3.

A negative feedback can be connected in a similar manner when the means for forming a primary signal is used in variants B and C according to FIGURES 2 and 4. This is readily understood from the above, and no description, therefore, is given.

Figure 7:
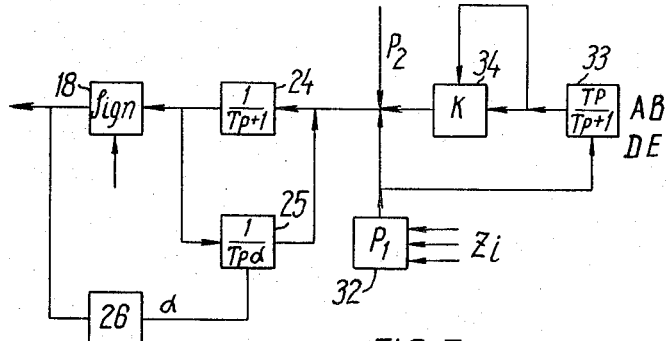
FIGURE 7 is a schematic diagram of the means for shaping a feed-back signal indicative of the position of the control valve drive of the prime mover with variant B of the means for shaping primary control signals.

Usually it is impossible to obtain the signal proportional to the power of the prime mover in a direct way, and therefore to obtain it we utilise the position of the drives of the control valves Z of prime mover, which give a single-valued measure of the prime mover power under static balanced conditions when the parameters of the energy supplied to the prime mover remain unchanged (for a turbine, steam pressure before the valves remains unchanged). Under transient conditions, the power of the prime mover may considerably lag behind the changes in the position of the control valve drive (for instance, owing to intermediate steam volumes in steam turbines). Therefore, to enable the feedback to display the optimum effect, the output of the means measuring the prime mover power is provided with time differentiating means, whose signal is subtracted from the signal proportional to the prime mover power. The diagram of the feedback means under consideration is illustrated in FIGURE 7 in conjunction with the means for forming a primary control signal in accordance with variant B in FIGURE 3, comprising an integrating amplifier (a similar effect can be obtained with the help of variants A and B in FIGURES 2 and 4).

The signals from the pickups measuring the position of the drives of the control valves $Z_1$ are directed to converter 32, the signal at the output of which is proportioned to the prime mover power under static operating conditions—channel D. This signal compensates for the signal proportioned to the generated power P2 and goes to differentiating amplifier 33, the signal from which partially compensates for the signal from converter 32—channel E.

To improve the stabilising effect of the feedback as regards the position of the valve drives under small disturbances, the signal from the differentiating amplifier is controlled by means 34. Under small variations occurring in the signal from the converter 32–P1—means 34 maintains a small gain factor for the signal from differentiating amplifier 33. As the signal from amplifier 33 exceeds the preset value, the gain factor of amplifier 33 grows as a result of the action displayed by means 34, thereby slowing down the tripping action of the feedback and ensuring high-speed changes in the position of the control valves.

Alternatively, the signal proportional to the prime mover power, for instance, in steam turbine, can be obtained with the help of the pressures in the turbine stages. In this case (illustrated in FIGURE 8) the signals from the pickups measuring the pressure $P_1$ in the turbine stages are fed to converter 35, the signal at the output of which is proportional to the power P1 (channel D) of the prime mover. As in the case of the feedback sensing the position of the control valves, the signal from converter 35–P1 compensates for the control signal proportional to the generated power P2, going to the differentiating amplifier 36, the signal at the output of which (channel F) is added up with the signal from converter 35, thereby amplifying the feedback under small deviations of the pressure.

It is essential to amplify the feedback under small deviations in the pressures or powers of the prime mover because of turbine inertia which is caused by intermediate steam volumes and upon small deviations it is likely to lead to oscillations. Means 37 at the output of differentiating amplifier 36 proportions the signal so that under small variations in the derivative at the output 36 the gain factor assumes a considerable value. As the signal at the output of amplifier 36 has reached the preset level, its gain factor decreases, thereby reducing the feedback and the desired acceleration of system operation.

Means for increasing or decreasing the proportion (gain) factors of the primary control signals and the feedback signals, as employed in the present system, is embodied in several variants for the first group of control channels. When it is connected after the variable dead zone, it does not require an input-signal dead zone of its own; whereas when it is connected before the variable dead zone, its own input-signal dead zone should be not less than the variable dead zone. The interaction of the means for varying the proportion factor of the means for forming a primary control signal has been described above in sufficient detail and is not, therefore, considered in this section. FIGURES 9 and 10 illustrate the connection of the means for varying the proportion factor 26, 38 in two variants, before and after the dead zone 18. In both cases this means is of relay type, with a signal normalised at the output (the signal normaliser and the relay can be structurally separated, as shown in FIGURE 8).

We have considered above the main features of the first group of control channels and the embodiments of the present system for formulating the control law required to eliminate failures.

Below we consider means ensuring the protection functions of the first group of the control channels and correcting the principal control law with the help of the means for forming primary control signals.

*Means for setting and varying the dead zone in the first group of control channels*

A dead zone is provided for in the present system to prevent disturbances of the drives of the control valves when control signals having small value are produced by the means for forming primary control signals under normal operating conditions. For the first group of control channels this zone, designed as 18, is common for all channels and can vary depending on the signal arriving from the means serving to vary it. The dead zone passes to its output, i.e., to the drive of the control valves, only those signals which exceed the dead zone in value. FIGURE 11 shows a diagram of the means used to control the dead zone in a simple case, when the control signal can be proportioned relative to the preset value and corrected in accordance with the shaft speed (the diagram is associated with variant B, FIGURE 3, of the means for forming the primary signal and it can also be used with other circuits for forming primary signals, as illustrated in FIGURES 2 and 4).

The initial dead zone of means 18 is established with the help of a signal supplied by the means 39 used for varying the dead zone. At the output of means 39, a part of this signal is compensated for by the signal from means 40 producing a signal proportional to the shaft rotation speed. As a result, under normal operating conditions the dead zone established by the signal supplied by these means to means 18 equals the difference of the setting signal from means 39 and the signal indicative of the normal shaft speed from means 40. As the shaft rotation speed increases, the dead zone reduces at the expense of an increase in the signal from means 40.

In some instance, this change in the dead zone is insufficient to eliminate the disturbance of the control valve drive under certain non-emergency situations (for example, connection of power transmission lines accompanied by variations in the generated power and load connected directly to the generator, etc.).

In addition, to eliminate accidental disturbances, it is advisable in some instance to establish an initial high dead zone, which fact requires it to be decreased to the normal level in operation of the first group of control channels. Otherwise, it becomes impossible to control the power of the prime mover in terms of changes in the generated power, and as a result the efficiency of the system deteriorates. Under certain operating conditions of the generator in a power system it is reasonable to vary the dead zone depending on the duration of the emergency situation, increasing the dead zone if the duration of the short-circuit exceeds the preset value.

In some instances, it is also advisable to vary the efficiency of the action displayed by the first group channels of the control system depending on the initial power of the unit. Moreover, the action of the first group of channels should not be high under small values of power and should reach the highest level under rated generated power.

The above conditions are provided with the help of a more complicated means for varying the dead zone of the first group of control channels, as illustrated in FIGURE 12.

The initial dead zone of the means 18 for creating a variable dead zone is preset by means 39, the signal from which is disrupted by relay 41 (becomes equal to zero) when a control signal appears after the dead zone 18. The appearance of a signal after the dead zone can be registered with the help of relay 7 of the means for varying the proportion factor and an additional relay opening the circuit of means 39. As a result of this, the dead zone is decreased in operation of the first group of channels.

To prevent operation of the first group of control channels under heavy synchronous oscillations of the generator, when a drop in the generated power is accompanied by negative acceleration, a provision is made for a second channel for controlling the dead zone, to which a signal is supplied from a pickup measuring the shaft rotation speed. The signal is directed to differentiator 42, whose signal is received by relay 43 which operates when the negative acceleration exceeds the preset value and sends a signal increasing the dead zone. To delay the action of this signal during synchronous oscillations we make use of time relay 44 which provides for the given time delay of the signal disappearing at its output after the disappearance of the signal from relay 43.

Time relay 44 interrupts the delay of the signal disappearing after the first group of control channels has operated and a control signal has been produced after the dead zone 18 and directed to the servomotors of the control value under the action of the signal from relay 26.

When the shaft rotation speed exceeds the preset value relay 45 operates, breaking with its contacts 46 the circuit of relay 43. As a result, the dead zone is returned back to the value measured by the signal arriving from the other means for varying the dead zone.

For controlling the dead zone depending on the duration of the emergency situation use is made of a third channel for varying the dead zone, the input of which is supplied with a discrete signal produced on the appearance of a signal at the output of the dead zone means 18 (the signal is designated as 47). In the diagram shown in FIGURE 12, this signal is obtained from relay 26 which is operated by a signal appearing at the output of the first group of control channels.

The signal from relay 26 starts up amplifier 48, breaking at the same time with its normally closed contacts 49 the feedback of this amplifier, which begins to perform integrating functions. The signal from amplifier 48 is directed to the dead zone 51 controlled by the signal from external means 50 (or preset manually in certain cases). As a result, the signal after the dead zone 51 appears only when the signal from amplifier 48 exceeds the value of the dead zone, i.e. a definite time after the appearance of signal 47 from relay 26. A device 51b is installed after the dead zone in order to provide for the required proportion factor which can be reduced to zero (when the circuit is broken) when a signal is produced by relay 45, i.e. when the shaft speed has passed the permissible level.

To control the dead zone depending on the value of the initial power use is made of a fourth channel for varying the dead zone. Input amplifier 52 of this channel serving to ensure the desired proportion factor is supplied with a signal determined by the position of the power setter P (synchronizer). As will be discussed below, this signal P is also used for the second group of control channels for the same purpose, i.e. the control dead zone.

Before being supplied to means 18, all signals controlling the dead zone pass through the means 53 separating the maximum signal, which has an additional input for external dead zone controlling means comprising amplifier 54.

Means for producing a signal proportioned to the initial power of the prime mover is shown in FIGURE 13 in the simplest variant, consisting of a converter 55, the input of which is supplied with a signal determined by the position of the power setter (synchroniser) 9.

The signal from synchroniser 9 equals zero when the setting is zero and has the rated value when the setting equals the rated power. Since the power of the prime mover is governed, in addition to the signal from synchroniser 9, by the parameters of the delivered energy (pressure before the control valves in a turbine), the shaft rotation speed, i.e. influence displayed by the shaft speed governor on the valve drive, the state of the thermal circuit of the prime mover (regeneration connection for a steam turbine) and non-linear dependence of the prime mover power on the position of the power setter (synchroniser 3. The circuit illustrated in FIGURE 13 comprises the respective signal correcting means.

Converter 55 has a variable proportion factor, the value of which is fed into the circuit illustrated in FIGURE 13 manually with the help of signal 56. An adder 57 is connected after converter 55 to convert the signal received by its input so that a minimum signal should correspond to the maximum load and, oppositely, the maximum signal at the output should correspond to the minimum load determined by the position of the synchroniser. Also through adder 57, a correction signal 58 is supplied to shift the characteristic P. Signals 56, 58 are used to correct the signal at the output of device P depending on the errors that have developed. Therefore, the circuit shown in FIGURE 13 forms the required signal for controlling the dead zone in eliminating the error due to manual correction.

In some instance, manual correction is insufficient to achieve the required accuracy, which is particularly important, as we shall show later, for the second group of control channels. For this specific case we have construed two variants of the means for forming a signal proportional to the initial power of the prime mover.

FIGURE 14 shows a schematic diagram of means for producing signal P, with the signal automatically corrected with respect to changes in steam pressure $P_0$ before the turbine and changes in the shaft speed $\omega$. The signal determined by the position of the power setter (synchroniser) 9 is supplied to converter 55 which has a controllable gain factor, i.e. it multiplies the signal from synchroniser 9 by the signal proportional to the sum of the relative pressure $p/p_0$ before the turbine and the external correcting signal 56. The signal $p/p_0$ is taken from converter 59. After converter 55, the signal is directed to adder 60 which adds the signal to a signal proportional to the change in the shaft rotation speed $\omega$ and the manual correction signal 58, i.e. the signal at the output of adder 60 equals: $X55-X51\pm X58$, where $X55$ is the signal from converter 55; $X61$—the signal from converter 61 and $X58$—the signal from manual correction means 58. The signal from converter 61 equals zero at rated shaft speed. The shaft speed will change by a non-uniform value of shaft speed control. The value of coefficient K is selected depending on the desired relation between the dead zone and the signal produced by this device.

The output of the means is also provided with an additional converter 62 which makes the output signal P equal to zero with a maximum signal at the input and to the rated value when the input signal equals zero, corresponding to the power setting also equal to zero.

Therefore, the means under consideration effects correction of the signal arriving from synchroniser 9 when steam pressure changes before the turbine, and also when the shaft rotation speed deviates from the rated speed it allows manual correction of the signal as regards the steepness of the characteristic (56) and its shaft (58). Thanks to the above, the signal P is caused to agree with the initial conditions power with sufficient accuracy.

The second variant of the means for automatic correction of the signal proportioned to the position of the power setter (synchroniser) is a modification of the above-described circuit and is employed to obtain a signal proportional to the plant power. As in the previous case, the signal from synchroniser 9 is supplied to converter 55 and is corrected, as in the previous case, in terms of the pressure $p/p_0$ before the turbine. The signal from the output of converter 55 arrives at the input of amplifier 63 embraced by integrating amplifier 64, the input of which is also supplied with a signal proportional to the current generated power P2. As a result, the integrating amplifier eliminates the disagreement between the output signal of amplifier 63 and generated power P2, ensuring their quality. The input of integrating amplifier 64 is directly supplied with the signal from manual correction means 58. To avoid false functioning of the means under emergency situations, when the generated power tends to vary over a wide range and its value does not predetermine the power developed by the prime mover, use is made of relay 65 which disconnects the input of the integrating amplifier from the comparison circuit when its input 66 is supplied with a signal indicating the development of an emergency situation. As in the first variant, the output of these means is provided with converter 62, which makes the signal P equal zero with the maximum signal at the input and the maximum value when the input signal equals zero. The provision for this converter is, as we have stated, explained by the necessity of a maximum dead zone to be established under a minimum power of the plant.

*The second group of the control channels*

The second group of control channels is used to prevent overloading of the equipment at changes in the generator operating conditions in the power system, deviation of the controllable coordinates from the permissible values, as well as for protecting the power plant elements from overloads during operation of the first group of control channels considered above. As regards its functions, this group is a protective power limiter.

The law of the action displayed by the second group of channels is formulated by pickups, whose signals are supplied to means for forming primary control signals and means for creating a variable dead zone.

The power limiting functions are ensured by the power setter (synchroniser) 9 being moved to a position corresponding to a new power value established by the action of this group of channels which, on performing their function, trip off automatically.

The second group of control channels serving to control various coordinates may comprise a large number of channels having identical properties as regards their action on the prime mover and the laws which they realise. Therefore, in some cases, as we have done in this case, it is reasonable to join the channels in separate subgroups. FIGURE 16, having the same reference numerals as FIGURE 1, shows the second-group channels combined into four subgroups having identical dead zone setting means 18 and means 19 for varying the dead zone, means 67 for separating the maximum signal for each subgroup of channels and means 15 for forming a primary signal from pickups 16 for each of the channels and means for varying the proportion factor of the primary control signals depending on the signal at the output of channel 17 (identification as earlier). Depending on the required law to be performed by each subgroup of channels there are various ways for transmitting signals from their dead zones 18 to the common means for separating the maximum signal controlling the drives of control valves 13 and synchroniser 14. As an example, FIGURE 16 shows the possibility of direct connection of the subgroup and means 13 and 14; direct connection of the subgroup and means 13 and means 14, via relay element 68; direct connection with means 14 alone, and with means 14 via relay element 69.

Alternatively, in specific embodiments the separate subgroups of channels can additionally be joined by a common means for separating the maximum signal from the subgroups. This possibility is embodied in a circuit (designated as 20) similar to that shown in FIGURE 1.

Below we consider methods of designing means determining the composition of the second group of control channels and their distinction, if any, over similar means of the first group of channels.

Means for forming primary control signals in conjunction with means for varying the proportion factor of the second group of channels ensure the desired non-receptivity to variations in the pickup signal, prevent appearance of control signals when the pickup signal is smaller that the dead zone and vary their proportion (gain) factor when a control signal appears at their output. The dead zone in regard to the pickup signal can be preset manually and corrected in accordance with the signal supplied from the other pickup.

FIGURE 17 illustrates a diagram of two channels with common means 67 for separating the maximum signal for each channel with the help of dead zone means 18, the dead zone varying depending on signal 70, and means 15 for producing primary control signals for one channel and means 71 for the other, as well as means 72 for varying the proportion factor controlled from relay 26 which is connected after dead zone 18 for the first channel and relay 38 connected before dead zone 18 for the second channel. The means for forming primary control signals for the first channel is shown consisting of two pickups 73 and 74, one of which can produce a feedback signal (for example, pickup 73 may be used to measure steam temperature and pickup 74— the temperature of the turbine cylinder wall, thereby monitoring the temperature differential).

The dead zone created in means 15 in relation to the pickup signal for the first channel is preset manually during the adjustment of the system (for example, the setting of a permissible temperature level above which the differential is controlled in the described example and in other instances).

For the second channel, the dead zone may be established manually with respect to the input signal 75 (for instance, setting of the permissible pressure level in the turbine control stage, permissible coupling angle between the generator and the power system, etc.) and with regard to signal 76 from the other pickup (for instance, the setting of the permissible level of steam pressure in the control stage depending on the power setting. As a result, under small load on the plant, power will be limited much sooner. In the same manner it is possible to control the coupling angle of the generator and the power system so that the permissible angle value will vary with changes in the number of connected power transmission lines, and in other instances).

Means 72 for varying the proportion factor may also be indifferent to the influence of the signal at the channel output, i.e. it may only comprise means 72 for setting the propotrion factor, as shown in FIGURE 18. This does not affect the design of the other means and elements.

The means for forming primary control signals can also receive pickup signals, which are either changing in proportion to the changes in the coordinate being controlled or are supplied by discrete-output pickups producing signals of a definite amplitude.

Proportionate-output pickups are used for continuously controlling pressure, temperature, current in the transmission lines, coupling angle between the generator and the power system, etc., the control law being determined in this case by the presetting of the second group of control channels associated with these pickups, as has been considered above.

Discrete-output pickups are used to control the composition of equipment in operation and to provide limit protection from overloads. In this instance, the control pattern is determined by the setting of the second group of channels and the amplitude of the signal supplied by the pickup. Under the effect of a normalised pickup signal i.e. a definite-amplitude signal, the means for forming primary signals, as considered above, serves to alter the dimensions of the signal supplied to the next circuit, i.e. it presents the level to which unloading should be effected in the absence of a dead zone means 18. Thus, when a discrete signal appears, indicating disconnection of the power transmission lines, feed pump or any other equipment, the second group of channels unloads the unit to the level preset by the dead zone input signal of means 11 and dead zone means 18 (FIGURE 18).

As stated above, the dead zone means 18 can be made common for several control channels and, as a result, it may have at the input a means for separating the maximum control signal from several channels 77 connected in parallel. This embodiment of the second group of channels is illustrated in FIGURES 18 and 19. The dead zone of the means 18 can be altered manually so that a common dead zone should be set up for the whole group of channels. In addition, the dead zone of means 18 can be controlled in terms of the signal proportioned to the power setting of the prime mover, said signal being produced by the means considered in detail in connection with the description of the first channel group and illustrated in FIGURES 13, 14 and 15.

The control of the dead zone in terms of the power setting of the prime mover, otherwise called the initial power, allows realisation of the laws permitting the prime mover to be unloaded to a given level irrespective of its initial power (no loading is, naturally, required when the power is below the preset level). Being particularly important for equipment protection, this control pattern should preferably be considered in connection with the case when the input of one of the second-group channels is supplied with a discrete signal, requiring complete unloading of the unit, i.e. unloading to unit power $S_{76}=1$ (see FIGURE 19).

As a result, the output of the means 71 for forming primary control signals will produce a signal which equals the difference $S_{76}-_{71}=S_{71}$, where $_{71}$ is the input-signal dead zone and $S_{71}$ is the signal at the output of means 71.

Having passed the variable dead-zone means 18, the signal equals $S_{71}-P=S_{18}$, where P is the signal from the device illustrated in FIGURE 13, or 14, or 15, $P=1-P10$ in the device circuit and P10 is the initial power of the prime mover; $S_{18}$ is the signal at the output of means 18. Alternatively, assuming $S_{16}=1$;

$$S_{18}=1-71-(1-P10)=P10-71$$

i.e., the signal indicating the need of unloading equals the difference between the larger value of current power P10 and the setting value 71 with respect to the input signal.

The problem of preventing overloading of the equipment requires not only the unit to be unloaded when the coordinates exceed the preset permissible values, but also prevention of power rising when there is a threat that any further power rise is likely to operate the second-channel group which reduces the power. To solve this problem, we have provided for an additional small dead zone 78 (see FIGURE 19) after the means 18 for creating a variable dead zone. The size of the additional zone amounts to 0.2–1 percent of the signal requiring complete unloading, thus leaving the control law practically unchanged. When a signal appears before the additional dead zone (dead zone means 18 has passed the control signal), a signal 79 is produced which breaks the circuits controlling the power setter (synchroniser) to prevent any increase. As a result, the prime mover power cannot be raised by any other means when there is a likelihood of its being limited, thus ensuring more stable operation of the prime mover and the generator.

The need to prevent overloading of the power plant equipment is closely associated with the need to maintain a stand-by power in the power system. Since the critical parameters are selected with a margin for normal operation, in emergency situations involving frequency drops in the power system, a short-duration power over-loading is generally permissible for a definite time sufficient to commission the stand-by power of the hydroelectric station. To maintain such limitation laws, we have provided for respective means in the second-group channels. In such cases (see FIGURE 19) the pickup signal 80, which predetermines permanent limitation under normal operating conditions, is supplied to the means 81 for forming a primary signal via the contacts of relay 82 which are closed under normal frequency in the power system. When, however, the frequency drops to a value exceeding the preset level in relay 83, which is supplied with a signal proportional to the mains frequency, relay 83 operates, cutting in time relay 84 which unlocks contacts 82 for a definite time $t$. As a result the coordinate is not limited by pickup 80 for the time $t$ and the power can for a short time be raised by the unit speed governor to the second stage of the coordinate limitation effected by the second channel having a large setting (preset with the help of means 15 in FIGURE 19).

We have considered the main features of the first and second groups of control channels of the present system in general terms sufficient for the system to be accomplished in various modifications and arbitrary combinations of the system components considered above, the control principle requiring no further description.

For illustration, we consider below some specific embodiments of the claimed system and its operation under diverse conditions.

*Multi-channel system for controlling prime mover power*

The first group of channels in the multi-channel system for controlling the power of the prime mover, of an A.C. generator can be designed in several embodiments in conjunction with the second groups of channels or separately therefrom.

To illustrate this, FIGURE 20 shows an embodiment of the first control channel group, comprising hydraulic and mechanical elements, similarly to FIGURE 7 of the structural diagram (reference numerals used in FIGURE 20 and elsewhere are those shown in FIGURES 1 and 7).

In this embodiment, the means of the first channel group control the drive of the control valves via lever 12, which also adds up the influence of the shaft speed meter 8 and power setter (synchroniser) 9. Control valve drive 4 can be of hydraulic type with a servomotor and slide valve 6.

The means for forming the primary control signal is provided with an integrating amplifier 25 which is controlled from slide valve 24 and whose position is determined by the output signal supplied by this means. The time constant of the integrating amplifier is altered when the slide valve 24 deviates to a value exceeding the height of the port 21 through which the working fluid is delivered. In this case, the time constant of the integrating amplifier starts to be measured by the throttled port 26, rising to the required level. Levers are used to add up the signal from the active generated power pickup (signal P2) and the feedback signal P1 proportioned to the prime mover power and measured in accordance with the position of the drive of valves 6. The means for establishing a dead zone is made as a clearance 18 preventing the passage of the signal from the first channel group to the servomotors. The output is provided with means 85 which returns the end of lever 12 to the initial position when the control signal disappears.

It is understood from the disclosure of the means illustrated in FIGURE 20, that it is used to realise the principal law of the given group of channels, controlling the position of the drive of valves 6 depending on the variations of generated power P2. Under normal conditions, the relation between the generated power and turbine power does not alter and the output element of the means 24 for forming a primary control signal assumes the middle position, thus precluding the appearance of a signal at the output of this group of channels under small disturbances of power thanks to the dead zone 18. In response to short-circuiting or generator disconnection from the mains, the generated power drops (level point P2 goes up), thus causing slide valve 24 to go upwards and select the zone 18. As a result, drive 6 moves down closing the valve until its slide returns to the middle position. While moving down, drive 6 effects partial compensation of the changes in the signal P2 thanks to the downward movement of the slide valve 24. Owing to the throttling of ports 21 of the slide valve 24, the integrating feedback effects only slow compensation of the deviations of the slide valve 24 from the middle position.

When the short-circuit it eliminated, the generated power rises, the lever point P2 descends, thereby eliminating the influence of the signal forming means, and the means 85 returns the lever end 12 to the initial position.

FIGURE 21 shows another electrohydraulic, embodiment of the first group of control channels similarly to the one shown in FIGURE 5. In this embodiment, the first group of channels (identified as in FIGURE 5) controls the drive of control valves 6 via hydraulic transmission 12 leading towards the servomotor of the valve drive (shaft speed governor and other elements not pertaining to the present system are not shown in the drawing). The means for forming a primary control signal is provided in this case with an integrating amplifier 25 which is controlled from a slide valve rigidly connected with a quick-acting amplifier 24.

The quick-acting amplifier 24 is made as an intermediate servomotor controlled by an active generated power meter 86 comprising a converter 87 which produces a control signal P2, and the pickup 31 of derived rotor speed, comprising a hydraulic converter 88. The time constant of the integrating amplifier is varied through throttling of ports 21 through which the working fluid is delivered to the amplifier. In addition, the time constant of the integrating amplifier starts to be determined by the through section of throttle 26 (throttle 89 determines the time constant of this amplifier when port 21 is open). Throttles 90, 91 and 92 are of auxiliary importance, serving for circuit adjustment.

Slide valve 24 is used to reduce friction and is made rotatable under the force of oil flowing through throttle 90. The tripping feedback of amplifier 24 can be made of non-linear type with the help of profiling and comprises a disconnecting cone 93 which provides for a small degree of disconnection at high speed, thereby enhancing the quick-acting. The output of the means for forming primary signals is provided with an additional amplifier 85 which is also controlled by slide valve 24, and more particularly, by its lower part 94. Throttles 95 and 96 of this amplifier are used for adjusting its time constant in accordance with power surges in order to prevent impermissible speeds. The output of additional amplifier 85 is provided with a variable dead zone element 18, the dead zone being variable by the displacement of box 97 and under pressure variations in the chamber of throttle 96. Alternatively, pressure can be altered from an external means.

Under small disturbances of the generated power determined by the signal P2 from pickup 86 and with small values of the positive rotor acceleration, i.e. small signals from pickup 31, a change in the position of slide valve 24 does not cause the opening of control port 98 leading to the valve drive owing to the compensating action of integrating amplifier 25. At short circuits, when the signal from pickup 86 causes the displacement of slide valve 24 upwards under positive acceleration, the slide valve moves additionally in the same direction under the effect of the signal proportional to rotor acceleration (pickup 31).

A considerable displacement of the slide valve causes the closure of ports 21, thus causing a sharp increase in the time constant of amplifier 25 and displacement of slide valve 24 in proportion to the signal generated. The opening of control port 98 following the movement of piston 85 applies a corresponding action to the servomotor. When the generated power has been restored, the control pulse directed to the valve drive vanishes at a rate determined by the time constant of piston 85 moving to effect closure of the port. It should be noted that in response to a drop in the generated power and negative rotor acceleration signal the primary control signal diminishes in comparison with the positive acceleration signal, thus preventing false operation of the first group of channels upon disturbances which do not threaten to develop into a major failure.

FIGURE 22 shows an embodiment of the first group of channels in a hydraulically operated circuit, similar to the one shown in FIGURE 21 but having a feedback for steam pressure in the turbine control stage, as in FIGURE 8. The means for forming primary control signals is distinct from that shown in FIGURE 21 in the addition of throttle 99 which is used for tuning the device.

The feedback for steam pressure $p1$ in the turbine control stage comprises a diaphragm converter 100, which houses a flexible diaphragm 101 serving to differentiate the steam pressure signal. The non-linear action of the feedback, as described above, is maintained with the help of converter 102 having a profiled port. In operation, this device is similar to diagram 21 and is only distinct in the feedback, which reduces the value of the generated power signal from pickup 86, which fact requires the control signals from generated power pickup 86 to be larger than in the circuit illustrated in FIGURE 21. In operation all the elements of this circuit are not much different from those shown in FIGURE 21.

FIGURE 23 shows an embodiment of the first group of control channels with means for forming a primary control signal, similar to the embodiment shown in FIGURE 21 but having a feedback for several values of pressure in the turbine stages ($p1$, $p2$, $p3$). In addition, this circuit also comprises a speed governor 8 and control valve drive 4 with a servomotor 6 (the servomotor drive has a hydraulic feedback). This embodiment is distinct in that the dead zone 18 is variable under the influence of a signal proportional to the shaft rotation speed, supplied into the lower chamber of slide 24. In operation, this circuit is similar to those shown in FIGURES 21–22 and requires no more description.

FIGURE 24 shows yet another embodiment of the first group of hydraulically operated control channels with means for forming primary control signals represented by an integrating amplifier. In principle, this circuit is similar to those illustrated in FIGURES 21, 22 and 23 as regards the design of amplifier 24 and is distinct from them in that generated power pickup 86 has a hydraulic amplifier at the output to convert the movement of lever 103 into a hydraulic pulse P2. Another distinction consists in that the feedback is used for the position of the main servomotor with a differentiator, similarly to the circuit in FIGURE 7.

The derivative of the change in the position of rod 32 is obtained owing to the slidability of box 33, which moves from the extreme top position at considerable rates of movement of rod 32, thereby preventing changes in the clearance between rod 32 and box 33. As a result, the feedback deminishes, thus ensuring the necessary re-adjustment of the slide of the means 24 for forming primary signals. Throttles 105, 106 and 107 permit adjustment of the device in terms of the time constant of the differentiator and the value of the relative speed at which the differentiator is started up. All the reference numerals in FIGURE 24 are similar to those used in the other circuits, and owing to this fact and the similarity of the principal elements it is not necessary, to describe in detail its design and operation, which are explained in FIGURES 21, 22 and 23.

FIGURE 25 shows a combined embodiment of the first group of hydraulically operated control channels according to FIGURE 24 and the second, two-channel group. The first group of control channels in this embodiment was described above in connection with FIGURE 24 and is not, therefore, considered, whereas the second group of control channels is considered in more detail as regards the means for forming primary control commands. The electric circuit is of secondary importance and is not considered in detail. The second group of control channels desgined in accordance with the structural diagram shown in FIGURE 18 is employed in conjunction with pickups having discrete outputs, i.e. recording the necessity of limitations when the controllable coordinate has reached the critical value or the equipment has tripped off. In particular, this circuit was used for limiting the power when the transmission lines were disconnected and the genator was cut off from the mains.

The first control channel of the second group receives a pickup signal which operates electromagnet 108, which opens the drain of the working fluid out of the pulse control line 12 connected with the drive of the control valves. Therefore, element 109 performs the functions of a pickup (as 75 in FIGURE 18) which converts a random electric pulse directed to electromagent 108 into a normalised hydraulic command sent to the drive.

The opening of the control port is effected by intermediate amplifier 85 which is similar to those considered in FIGURES 21, 22 and 23 (the same reference numerals are used) and serves to prevent high rate of power surge when the signal in windings 108 disappears (the time constant of this amplifier is small with respect to power drop).

The signal which effects power drop is proportioned by means 110, which comprises means for creating a variable dead zone, setting of the power level to which undoading is effected, for varying the proportion factor, and the input of the second control channel which unloads the unit to another setting level.

The means for creating a variable dead zone is made as port 72 in box 71, which is throttled by slide 19. The position of the box is generally determined by the given setting of initial dead zone preset with the help of drive 111, on whose bushing box 71 is freely resting. Thus it is possible to set the drive 111 in required position by supplying it with a signal. The position of slide 19 is determined by the position of the drive of synchroniser 9 in proportion to the preset power of the prime mover.

As a result, control port 72 whose width can be varied in the course of adjustment is throttled to the amount $h = xa - xb$, where $h$ is the opening of port 72; $xa$ and $xb$ are the displacement of box 71 and slide 19, respectively, upwards and downwards from the position in which the port is fully throttled, the prime mover power being equal zero. Substituting $xa = 1 - Sa$, in which $Sa$ is the setting, i.e. the power level to which the unit must be unloaded, and $xb = 1 - Sb$, where $Sb$ is the prime mover power setting, which under balanced conditions equals the generated power, the result obtained is $h = Sb - Sd$, i.e. the port is opened to the amount ensuring the required drop to the setting level.

To eliminate false operation, the supply circuit of electromagent 108 comprises a normally closed contact of braker 112, which breaks the circuit upon the closure of port 72. The setting value is monitored by pickup 113 whose readings are recorded by a respective instrument. When the second limiting channel operates, the signal is directed to electromagnet 76, thereby causing box 71 to move to the extreme top position, thus changing the setting to zero or other values. The contacts of circuit breaker 112 close, thus ensuring normal operation of the device irrespective of the power maintained by the unit in the initial conditions.

Below we consider the operation of the device in emergency conditions requiring limitations. As the power transmission lines trip off a signal produced by the respective pickup appears in winding 108; the electromagnet 109 operates if the initial power measured with regard to the setting value turns out to be above the setting (see explanation above). This operation is ensured by circuit breaker 112 which is closed in this position only. If the preset turbine power is below the setting, the first channel of this group does not operate. As device 109 operates, a pulse is transmitted to the drive of the control valves and at the same time the electric circuit transmits a signal to synchroniser 9, which reduces the power.

The position of the synchroniser altered to reduce the power causes reduction in the setting of the control valve drive and the valves are otherwise expected to close. But at the same time, owing to the reduction in the setting received by slide 19 of the dead zone means 18, the opening of port 72 diminishes, which would cause opening of the control valves. If a correct choice is made in the transmission ratio between synchroniser 9 and slide 19, port 72 closes without affecting the prime mover power and shifting of the synchroniser to another position. After the synchroniser has assumed a position corresponding to the preset power, the device falls out of operation owing to the feed circuit of the electromagnets being broken by circuit breaker 112.

During operation of the second channel, the signal is simultaneously supplied to electromagnets 108 and 76, thereby reducing the setting to zero, since the unit is unloaded to a fuller degree.

FIGURE 26 shows another embodiment of the second group of control channels according to the structural diaagram shown in FIGURE 18, together with the output element of the first group of control channels. Using the earlier reference numerals. FIGURE 26 shows a speed pickup 8, a synchroniser (power setter) 9 with drive motor 114, control valve 4 with servomotor drive 6. The speed control system is hydraulically operated. The present multi-channel system for controlling the prime mover power provides for electrically formed control signals and comprises electrohydraulic converters at the output. There are separate electrohydraulic converters for the first and second channel groups though a common converter can alternatively be used at the output of the system. The electrohydraulic converter of the first channel groups serves at the same time as the output amplifier, designated as 85. The electrohydraulic converter of the second group of channels serves at the same time as means for varying the proportion factor of the whole second group of channels and is designated as 72.

The means for primary forming of control signals in the second group of channels is of relay type with relay 75 which operates when its input is supplied with the respective signals. The level of the primary control signal is preset with regard to the position of the resistance slides 71.

The signal from the means for primary forming of signals in this subgroup of channels is directed to the dead zone setting means 18, the value of the dead zone being preset by supplying a diode-closing signal to resistor 19. The means for varying the dead zone is receptive to the signal from power setter (synchroniser) 9. The position of synchroniser 9 is recorded by pickup 115, to which a correction is made in terms of the characteristic steepness (gain factor). Correction for shifts in the characteristic is introduced with the help of means 116. The signal from the dead-zone setting means is directed to amplifier 117 which controls electromagnets 118 of converter 72. Magnetic amplifier 117 has different time constants as regards the drop and rise of loading and at the same time functions as means for separating the maximum signal out of the signals supplied to its input. Simultaneously with the delivery of signals to amplifier 117, a signal is directed to relay 68a which in turn sends a "decrease" signal to synchroniser 9. As a result, when this group of channels operates, as described above, the change in the synchroniser position causes disconnection of the devices after the synchroniser has been shifted to a new position which is determined by the disappearance of the signal delivered to amplifier 117. The signal disappears when the voltage across resistor 19 rises to the level of the control signal from diode 18.

In addition, the circuit comprises yet another channel in the second group of control channels, which monitors the coupling angle of the generator and the power system. The effect of the signal from this additional channel is realised via amplifier 117 and relay 68b, connected with the "decrease" control circuits of the synchroniser.

The design of the coupling angle pickup and the principles of its operation are considered below. A synchronous motor, whose rotor 119 is rigidly coupled with generator rotor 120 is used to control the position of the E.M.F. vector of the generator coupled to the rotor and the vector of the receiving part of the system, the angle between which predetermines generator stability under static conditions in the power system. The stator 121 of the synchronous motor is mounted in bearings 122 and is capable of changing its position in space. The synchronous motor stator is fed from circuit 123, which maintains the vector of the supply voltage in phase with the voltage vector of the receiving part of the system. Under the effect of the rotary field of the synchronous motor stator and rotor, stator 121 changes its spatial position, which causes displacement of magnetic core 124 connected with the stator. A change in the position of magnetic core 124 causes changes in the current flowing in induction pickup winding 125 and appearance of a signal at the output 126 when the angle has reached critical limits (the zero of pickup 125 is compensated for by device 127). To vary the moment when a signal from pickup 125 appears, the other, rotary part of magnetic core 128 which closes the poles of pickup 125 is capable of changing its position under forces transmitted via drive 129.

Pickup 125 can be accomplished in a different embodiment, such as in the form of a rheostat. Under the influence of the coupling angle meter considered above, the interaction of the second channel group does not change from that described earlier.

FIGURE 27 shows a principal diagram of the first and second groups of control channels performing a specific range of tasks. The circuit, whose separate elements perform definite functions, can be considered as an embodiment of the present invention used for forming laws by electricity with the help of individual means. Different methods may be used to realise a specific embodiment. Describing the circuit, we are considering the embodiments of the various elements and means having distinct designs.

One of the embodiments of the structural diagram considered above is described below by way of example.

FIGURE 27 shows an intermediate steam super-heated turbine with high pressure cylinder 130, low-pressure cylinder 131, intermediate super-heater 132, high-pressure control valve 133 and medium-pressure control valve 134 (considering that the present example also relates to an embodiment of the device, all the elements of the circuit are identified by subsequent serial numbers). Drives 135 and 136 of the high-pressure and medium-pressure valves, respectively, are controlled under the law determined by means 137, which is a part of the speed control system 138, comprising a speed meter 139 and a power setter (synchronizer) 140. In this example, synchronizer 140 is provided with a drive motor without a feedback, which motor is used to reduce the power by signal 141 and to raise power by signal 142. Control signals are supplied to the synchroniser via input 143 and to both valve drives via input 144 (the units and devices not directly pertaining to the present system are shaded).

The first group of the control channels (designated as a square) is accomplished in accordance with the variant shown in FIGURE 8, comprising a generated active power pickup 145, converter 146 effecting changes in the proportion factor of the signal from pickup 145, an adder 147, amplifier 148, whose output signal is compensated for by integrating amplifier 149. In addition, adder 147 is connected with the output of converter 150 which, on receiving signals from the pressure pickups in the turbine high-pressure control stage 154 arranged after the high-pressure part 152, and in the medium-pressure control stage 153, produces a signal proportional to the power PI generated by the turbine. The signal from converter 150 also goes to real differentiator 154 and to adder 147. The signal from means 154 can be reduced from the maximum level to the minimum level by relay 155, which alters the signal value when the signal at its input has reached a preset level (a relay with a preset operation current setting, having a normally closed and a normally open contact which commutates the circuit of adder 147). The signal at the output of adder 147 is:

$$X147 = X146 - X150 - X155$$

where XI designates signals from the respective elements $i$.

The time constant of integrating amplifier 149 is altered by the signal upon operation of relay 156 in response to the signal at the output of dead zone 157. Dead zone 157 (a diode with variable reference voltage or a magnetic amplifier with controllable bias) is altered by the signal from the means serving to vary the dead zone of the first group of channels.

The dead-zone varying means (designated as a square with bevelled corners) is made in accordance with FIGURE 12 and its output connected with means 157 is provided with means 158 for separating the maximum signal (the channel outputs of the dead-zone varying means are connected to a common load through diodes, thus assuring the required conversion).

The initial dead zone is preset with external source voltage 159 which is supplied to means 158 through normally closed contacts 160 of relay 156. After relay 156 had functioned, contacts 160 open.

From pickup 161 which measures the shaft speed, the signal is directed to differentiator 162, while its acceleration signal arrives at the relay winding 163 with preset operation current at negative value of signal X162. The signal from the contacts of relay 163 goes to normally closed contacts 164 of relay 165. Relay 165 operates when the shaft rotation speed changes to a definite amount (2–4 percent). The signal X164 goes to relay 166, which delays the disappearance of the signal at its output for 0.5–1 second after the signal has disappeared at its input. The delay of signal disappearance, effected by relay 166, is immediately interrupted when a signal arrives from relay 156, recording the appearance of signal at the output after the dead zone, i.e. relay 166 is supplied through the normally closed contacts of relay 156.

As a signal appears indicating the operation of the first channel group, amplifier 167a starts to perform integrating functions owing to the disconnection of its feedback by relay 167b, whose signal is supplied to dead zone 168 of this device. As the signal X167 rises to the value of the dead zone 168 (diode run by reference voltage which predetermines the dead zone) it is sent to means 158 for separating the maximum signal, passing through normally closed contacts 169 of relay 165 and varying the dead zone depending on the duration of the short-circuit.

The value of the dead zone of means 160 can be set manually from outside means, not shown in the diagram, with the help of signal 170. Means 158 is also supplied with signals 171 from outside control means, not shown in the drawing, via matching amplifier 172, and also a signal depending on the initial power of unit 173 via matching amplifier 174.

The second group of control channels in the present system comprises seven channels forming four subgroups (triangle-shaped symbol).

The input of channel G is supplied with the signal from pickup 175 which records the disconnection of the generator supplying the power system from the mains. The channel comprises a separating relay 177, which proportions the amplitude of the pickup signal, a means 178 for primary forming of signals, having a dead zone established by signal 179, an amplifier 180, whose signal is supplied to means 181 for separating the maximum signal.

The channel H monitors the coupling angle of the generator and the power system and comprises pickup 182, used for measuring the coupling angle and having a supply circuit 183 which is not considered herein detail (it is supplied with signals from power transmission lines 184, of which only one is shown for convenience; the generator commutating means are not shown in the drawing), means for creating a dead zone relative to the input signal 185 (the value of the dead zone is set by signal 186) and an amplifier 187. Amplifier 187 directs its signal to means 181.

The channel I operates when one of the transmission lines has been cut off from the generator, the cutoff being recorded by pickup 188. The channel comprises a relay 189 normalising the amplitude of the pickup signal, dead zone 190 set relative to signal 191 and output amplifier 192, whose output signal is directed to means 181.

The channel K monitors pressure changes on the diaphragm of the last stage of the turbine high-pressure part. The signal arriving at its input amplifiers 193, 194 is supplied from pressure pickups installed before diaphragm 195 and after diaphragm 152. The channel is provided with means 196 for creating dead zone with the help of signal 197, and amplifier 198. The channel is connected with means 199 separating the maximum signal.

Channel L monitors the critical permissible levels of the pressure in the control stage of the turbine high-pressure part, a signal proportional to this pressure being directed from pressure pickup 151 to amplifier 200. The channel is provided with means 201 for creating a dead zone, the value of which is preset by signal 202, and amplifier 203 having its output connected to means 199.

Channel N monitors steam pressure before the turbine and comprises pressure pickup 204, means 205 for creating a dead zone relative to signal 206, and output amplifier 207 connected with means 208 for separating the maximum signal. Channel O maintains the preset turbine power under initial conditions by monitoring the steam pressure in the control stage with the help of pickup 151, a pulse from which is directed to dead-zone means 208 via normally closed contact 210 of time relay 211. The time relay operates when the shaft rotation speed drops below the preset level (preset operation current relay) and generates at its output a disappearing signal having a duration which is preset. The signal is designated as 212. and relay 213 operates and opens the contacts 210 for the same period. The channel is provided with amplifier 213, the dead zone being varied with the help of means 209 by preset signal 214.

Means 181 for separating the maximum signal supplies the maximum signal to dead-zone means 215, the dead zone varying in response to signal P (the dead zone can also be varied by changes in the reference voltage of the diode, with the help of which the dead zone is established).

The signal from means 215 goes to relay 216 which breaks the "increase" circuits of the synchroniser and to additional dead zone 217 which does not pass small signals. The signal from 217 is directed to common means 218* for separating the maximum signal and to relay 219, from which it goes to means 208 for separating the maximum signal. The signal from the means 199 used for separating the maximum signal goes directly to common means 218 for separating the maximum signal.

The signal from means 208 separating the maximum signal is directed to variable dead zone 220 which is controlled by signal P proportional to the initial power; and from dead zone 220 the signal is sent to relay 216 to break the circuits to enable the synchroniser to increase the power, and via additional dead zone 221 to relay 222 which suplies the signal to input 143 of the synchroniser to enable it to reduce the power.

The channel O is connected directly to the input of additional dead zone 221 and functions similarly to the channels employing means 208.

The signal P proportional to the initial power is formed with the help of the means whose structural diagram is shown in FIGURE 14 (circle in the drawing). From pickup 223 indicating the position of the output part of the synchroniser the signal is supplied to converter 224, whose gain factor varies depending on the pressure in front of the turbine—with the aid of the signal from means 225 or manual means 226. The signal goes further to adder 227, to which a correcting signal indicative of the shaft rotation speed is supplied—with the help of ---
*Means common for all channels are shown in the form of rectangles having one bevelled corner.

means 228 or manual means 229. The output converter 230 makes the conversion $X230=1-X227$. The signal from converter 230 goes to means 215, 220 and 174.

The output of the common means 218 for separating the maximum signal is provided with electrohydraulic converter 231, which converts the electric signal supplied to its input to a control command transmitted to the drives of the control valves. The information on the action applied to the valve servomotors and the synchroniser is fed in the forms of signals 232, 233.

*Operation of the system in normal and emergency situations*

(1) Steam pressure drop in front of the turbine

Pressure dropping in front of the turbine causes operation of the channel N of the second group of channels, the signal at the output of variable dead zone 220 being equal to $X220=1-X204-X206-X230(P)$, where the signals, as in the previous description, relate to the outputs, i.e. the signal is the larger, the smaller the pressure signal X204, the smaller the pressure setting X206 and the higher the initial power XP. The signal X220 at first breaks the circuit to cause increase in the synchroniser power with the help of relay 216, and as the pressure continues to drop, it switches in the synchroniser so as to decrease the power with the help of relay 222. The power continues to drop until the signal XP has completely compensated for the signal after dead zone 220.

(2) Drop of power system frequency

When the operation in the initial conditions process with power limited with the help of channel O in terms of the steam pressure in the control stage, the output of the channel being directed straight to additional dead zone 221, a drop of the frequency below a given value causes relay 211 to break with its contacts 210 the limiting circuit of channel O for a given time. As a result, the shaft speed governor is allowed to open the control valves until the pressure in the control stage exceeds the dead zone level, predetermined by the signal 197 of channel K. Further power increase will be stopped by the signal from channel K, the servomotors operating to reduce power. After the desired time period the relay 211 stops supplying the signal, thus restoring the circuit of channel O, and as a result, a signal is generated for the synchroniser to reduce the power (relay 222 operates). The power will continue to drop until the pressure in the control stage has dropped to a given setting determined by the signal X214. Moreover, after the channel O has been put out and the signal going to relay 222 has been discontinued, the synchroniser is prevented from increasing the power by its circuits being broken by relay 216.

(3) Connection of power transmission lines

Connection of the power transmission lines is likely to cause synchronous oscillations of the generator rotor, i.e. generated power. In this case the present system does not exert influence on the turbine power owing to an increase in the dead zone effected with the help of a channel of the respective means. If the rotor is caused to rotate with negative acceleration, the amount of which is determined by the preset value of the operation current of relay 163, a signal X164 is generated which has a given value increasing the dead zone of means 157. Signal disappearance is delayed by relay 166 for the desired time period, thus preventing operation of the first channel group after the second, third and further oscillations. The signal X164 demanding an increase in the dead zone is neutralized by the operation of the first channel group from the signal X156, and also when the shaft rotation speed has exceeded the preset value, under the effect of relay 165.

(4) Generator disconnection from the mains

When the generator is disconnected from the mains, its power drops to zero, thus causing operation of the first channel group. As a result, a signal is directed from the output of dead zone means 157 to the servomotors to effect closure, dead zone 157 reducing following the operation of the channel group and increase in shaft speed (relays 160 and 165 operate). The effect of the first channel group stops after the time required for integrating feedback 149 to compensate for the change in generated power.

Simultaneously with the first channel group, a channel of the second group operates directly in response to the generator disconnection recorded by pickup 175. As a result, the channel G after the dead zone means 215 produces the signal:

$$X215 = X177 - X179 - XP$$
$$= 1 - X179 - (1 - X227) = X227 - X179$$

which is equal to the difference of the initial power determined by the signal level after adder 277 and the setting value measured by signal 179. Owing to the operation of relay 219, the channel G sends another signal to the synchroniser, thereby causing disconnection of the channel as a result of signal XP completely compensating for the signal XP received from the channel G.

(5) Disconnection of power transmission lines

Disconnection of power transmission lines causes short-duration power drop, to which the first group of channels responds by sending a signal to close the control valves, the value of this signal being determined by the dead zone of means 157, which in such cases may be varied from outside means by a signal 171 being sent to amplifier 172, and it is also dependent on the unit initial power through the signal transmitted to amplifier 174.

Upon disconnection of the power transmission lines a signal is directed to the channel 1 which, like the channel G, unloads the turbine to the preset level determined by signal 191. If in spite of the unloading effected the disconnection of the power transmission lines causes the generator-power system coupling angle to rise, the channel H of the second channel group goes into operation. The channel H unloads the turbine to the preset level determined by signal 186, and the signal at the output of the dead-zone means becomes equal to the aforesaid:

$$X215 = X182 - X186 - XP = X182 - X186 - (1 - X227)$$

i.e. the signal is the larger the smaller the setting signal X186 and the larger the initial power X227.

(6) Short-circuit

A short-circuit occurring on the power transmission lines causes the generated power to drop and the first group of channels to operate, controlling the control valves in proportion to changes in the generated power. The influence displayed by the first group of channels is proportioned by the dead zone of means 157. The dead zone is the larger the smaller the turbogenerator power is under the initial conditions and the larger the duration of the short-circuit (the latter is determined by the action of integrating element 167a of the means for varying the dead zone). In addition, under these operating conditions the dead zone may be varied by outside action applied to input 171 of the dead-zone varying means. The interaction of the feedback and the individual elements of the first channel group has been considered in detail above. Upon disconnection of the power transmission lines the disconnection of the short-circuit is accompanied by the operation of the channel 1, while an increase of the coupling angle over the permissible value causes operation of the channel H, which has been considered earlier.

If the rate at which the power is restored after the drop exceeds the permissible values, the pressure in the control stage may rise above the permissible level, thus causing operation of the elimination channle L. If this is likely to cause a rise in the differential pressure on the diaphragm of the last stage, the limitation channel K operates, sending an "unloading" signal to the control channels, thus eliminating impermissible rates of power growth.

We have not considered all possible failures, since the functioning of the system will be understood by a skilled engineer from the examples considered herein. We have not considered the application of the proposed system for controlling a larger number of coordinates (the present system can be used to control simultaneously up to 30 coordinates).

Although we have described a few embodiments of the present invention and considered the possible structural diagrams of the various means constituting the claimed system, it will be appreciated from the present disclosure that the present invention is not confined to the embodiments disclosed herein. Therefore, amendments can be made in the embodiments described herein without departing from the idea of the invention presented in the claims.

What I claim is:

1. A control system for a prime-mover having control valves and driving an alternating current generator, comprising: a shaft-speed governor for said generator with a power setter, servomotors for driving the control valves of said prime mover, pickups for providing signals responsive to the conditions of elements of said prime mover and generator and to the operating conditions of said generator in the power system to which it supplies power; said control system comprising at least one control channel to ensure control of the power of said prime mover under emergency conditions, said channel having means for forming primary control signals, feedback means connected to the input of said primary control signal means compensating for said primary control signals depending on the influence applied by said control system to said prime mover, said pickups being connected to the input of said feedback means for controlling said primary control signal means; means for varying the proportion factors of said primary control signals and feedback signals depending on the signal at the output of the respective channel of said control channels; means for creating a dead zone which is connected with said means for forming primary control signals and feedback means which pass to the output only those of control signals which exceed a preset level; means for varying said dead zone having its output connected to said means for creating a dead zone, and means connecting the output of said means for creating a dead zone to the control of said servomotors driving the prime-mover control valves.

2. A system as claimed in claim 1 which, for ensuring control of the power of said prime mover under emergency conditions in the power system and the generator, comprises at least a second control channel having means for separating the maximum signal from the channels connected thereto, the output of said means for separating the maximum signal being connected to control said servomotor drives of the prime mover control valves, each of said control channels comprising means for forming primary control signals, feedback means, means for varying the proportion factor, means for creating a dead zone and means for varying the dead zone.

3. A system as claimed in claim 1 which, for ensuring control of the power of said prime mover under emergency conditions in the power system and under variations in the conditions of the elements of said prime mover and generator from permissible values, comprises at least another control channel of the type defined in claim 2 having a first means for separating the maximum signal from several quick-acting channels connected in parallel, means connecting the output of said first means directly to control said servomotors driving the prime mover control valve, a second means for separating the maximum signal from several slow-acting control channels connected in parallel, means connecting the output of said second means to said power setter for controlling said servomotors driving the prime mover control valve, and at least one of said control channels being connected to the first and second of said means for separating the maximum control signal.

4. A system as claimed in claim 3, having means for ensuring control of the prime-mover power at short-circuits and disconnection of said generator and power transmission line of the power system, comprising means for combining at least some of said channels connected to said first means for separating the maximum signal into a first group of control channels, said first means forming primary control signals for this channel group responsive to the increment of the active power of said generator; said second means forming primary control signals of this channel group responsive to the derivative of changes in the active power of said generator; said feedback means of this channel group being connected with said pickups measuring variations in the power of said prime mover and compensating for the algebraical sum of the signals from the first and second of said means for forming primary control signals, said means for varying the proportion factor of this channel group being made as a relay connected for operation responsive to a signal at the output of this channel group and increasing the signal from the first and decreasing the signal from the second of said means for forming primary control signals, and also reducing the signal from said feedback means; said group of channels having a common means for creating a dead zone which is supplied with an algebraical sum of the signals from said first and second means for forming primary control signals and from said feedback means, the output of said means for creating a dead zone being connected to said relay and to said first means for separating the maximum signal; said means for varying the dead zone of this channel group being connected to said pickups which monitor the operating conditions and the condition of the elements of said prime mover, generator and power system; an output amplifier being connected between the output of said means for creating a dead zone and said first means for separating the maximum signal.

5. A system as claimed in claim 4, wherein said means for forming primary control signals of the first group of control channels comprises a quick-acting amplifier, means connecting the input of said amplifier to pickups arranged to provide a signal proportioned to the active power of said generator and a signal from said feedback means, the output of said amplifier being connected to means common for all channels of said groups for creating a dead zone; an integrating amplifier embracing said quick-acting amplifier and effecting complete compensation of the signal at the output of said quick-acting amplifier with a proportion factor equivalent to the reverse value of the time constant of said amplifier, means for decreasing said proportion factor upon appearance of a signal at the output of said first group of control channels.

6. A system as claimed in claim 4, wherein said means for forming primary control signals of the first group of control channels comprises: a quick-acting amplifier, means connecting the input of said quick-acting amplifier to said pickups proportioned to the generated active power and to the shaft acceleration of said generator and the output being connected to said means for creating a dead zone common for said channel group, an integrating amplifier embracing said quick-acting amplifier and completely compensating for the signal at the output of said quick-acting amplifier with a proportion factor equivalent to the reverse value of the time constant of said amplifier, said proportion factor decreasing upon appearance of a signal at the output of the first group of control channels.

7. A system as claimed in claim 4, wherein said means for forming primary control signals of said first group of control channels comprises a first quick-acting amplifier and a second amplifier connected in parallel thereto and having a time constant which increases upon arrival of the signal from said relay, and the output signal effecting complete compensation of the output signal from said quick-acting amplifier, the inputs of both amplifiers being connected to receive a signal proportional to the generated active power from said pickups and a signal from said feedback means; an integrating slow-acting amplifier connected by its input to the common output of said two amplifiers in front of the means for creating a dead zone common for said group of channels and its output connected to the input of one of said amplifiers, the influence of the slow-acting amplifier eliminating errors in the complete compensation of the signal at the common output of the two amplifiers.

8. A system as claimed in claim 4, wherein said means for forming primary control signals of the first group of channels comprises a quick-acting amplifier and a second amplifier connected in parallel thereto and having a time constant which increases upon arrival of the signal from said relay and the output signal completely compensates for the output signal from said quick-acting amplifier, the inputs of both amplifiers being connected to said pickups to receive an algebraical sum of signals proportioned to the active power of said generator and to the time derivative of the generator shaft rotation speed; an integrating slow-acting amplifier connected by its input to the common output of said quick-acting and second amplifiers in front of the means for creating a dead zone common for the whole group of channels and by its output to the input of one of said amplifiers, the influence of the slow-acting amplifier eliminating errors in the complete compensation of the signal at the common output of the two amplifiers.

9. A system as claimed in claim 4, wherein said feedback means of the first group of channels comprises an adder connected for adding up signals from said pickups for recording the position of said servomotors of the control valve drive for obtaining a signal proportional to the power of said prime mover, the proportion factor of said signal decreasing upon appearance of a signal at the output of said first group of channels and recorded with the aid of said relay; a differentiator connected to said adder for differentiating the signal from said adder, the proportion factor of said signal increasing as the proportion factor of said adder decreases; an output adder connected so that the signal proportioned to the power derivative of said prime mover at the output of said differentiator is subtracted from the signal from said adder, the signal from said output adder being supplied to said means for forming primary control signals.

10. A system as claimed in claim 4, wherein said feedback means of the first group of control channels comprises an adder of pressures in the turbine stages connected for obtaining a signal proportioned to the power of the turbine used as a prime mover, the proportion factor of said adder decreasing upon appearance of a signal recorded with the aid of said relay at the output of said first group of channels; a differentiator connected for differentiating the signal from said adder, the proportion factor of said differentiator decreasing as the proportion factor of said adder varies; an output adder in which the signal from said differentiator is added up with the signal from said adder and whose signal is directed to said means for forming primary control signals.

11. A system as claimed in claim 4, wherein said output amplifier is a type which has a small time constant as the input signal decreases and a much larger time constant when this signal increases; means for varying the preset power of said prime mover being provided for reducing the proportion factor of said amplifier as the power of said prime mover drops, said latter means having its input connected to said pickup which measures the position of said prime mover power setter.

12. A system as claimed in claim 4, wherein said means for varying the dead zone of the first group of control channels comprises a first means for introducing an initial dead zone preset during adjustment; a second means recording the passage of the shaft speed of said generator above a value present during adjustment; an adder connected to subtract the signal from the second means from the signal obtained in the first means, the output of said adder being connected to said means for creating a dead zone.

13. A system as claimed in claim 4, wherein said means for varying the dead zone of the first group of control channels has an independent means for separating the maximum signal which is connected in parallel with means forming signals to vary the dead zone; a first means connected to said dead zone varying means for introducing a constant signal predetermining the initial dead zone; said latter means being connected so that the output signal therefrom decreases upon operation of said relay; a second means connected to receive a signal from said pickups for recording the appearance of a negative increment in the shaft speed of said generator and for supplying in response thereto an output signal increasing the dead zone, said latter means comprising a meter measuring the shaft speed increment and having a relay output operable at a preset value of said negative increment for providing said output signal; a relay connected for operation responsive to a signal above a preset value from said shaft speed pickup for breaking by its contacts the circuit of said second means; means for measuring the preset power of said prime mover, said latter means having its input connected to said pickup measuring the position of said prime mover power setter; a third means connected to said dead zone varying means for introducing a signal from said third means measuring the preset power of said prime mover, the signal from said third means increasing the dead zone as the preset power of the prime mover decreases below the predetermined level.

14. A system as claimed in claim 3, wherein to ensure control of the power of said prime mover upon variations in the state of the elements of said prime mover and generator from the permissible value, to prevent their overloading by limitation of the power of said prime mover, at least some of the channels connected to the first and second means for separating the maximum signal are combined in a second group of control channels, said means for forming primary control signals being provided and connected individually to each channel and preventing the operation of a given channel responsive to a signal from said pickups below a level allowable for the given operating conditions, the means for varying the proportion factor of individual channels being operable upon appearance of a signal at the output of a given channel only; the individual channels of the second group being united in subgroups connected to said means for creating a dead zone common for all subgroups, the value of the dead zone being constant for some of the subgroups, whereas for the other subgroups it is varied with the help of said means for varying the dead zone, the input of which is connected with the means for measuring the preset power of the prime mover, which is, in turn, supplied with signals from said pickup measuring the position of said prime mover setter; some of said channel subgroups being connected to said first and second means for separating the maximum signal, the other subgroups of channels being only connected to the second means for separating the maximum signal.

15. A system as claimed in claim 14, wherein said means for forming primary control signals of the second group of control channels comprises means connected for comparing the signals from said pickups and providing an output signal for a given channel according to the value of the signal supplied from said pickup with which the operation of the given channel is connected to vary by said output signal; means passing to the output of the means for forming primary control signals only positive signals requiring unloading of said prime mover; and means connected for varying the proportion factor of said means for forming primary control signals.

16. A system as claimed in claim 14, wherein said means for forming primary control signals of the second group of control channels comprises means connected for comparing signals from the pickups and having the setting thereof established for a given channel; means for separating a positive control channel requiring unloading of said prime mover; an amplifier whose gain factor is preset in advance depending on the required law, said amplifier being connected behind said means for separating the positive control signal.

17. A system as claimed in claim 14, wherein the individual pickups monitoring the condition of said elements are connected to said means for forming primary control signals through a relay having contacts connected for cutting off for a given time the respective pickups in response to a predetermined frequency drop in the power system for permitting a short-time overloading of said prime mover under emergency situations.

18. A system as claimed in claim 14, wherein one of said condition responsive pickups is arranged and connected for response according to the coupling angle between said generator and said power system and the input of one of said means for forming primary control signals being connected to said latter one pickup and has a synchronous motor whose rotor is connected with the shaft of said generator and has a stator freely mounted in bearings coaxially with said generator rotor; a supply unit for supplying said stator of the synchronous motor and being constructed and connected to provide a voltage cophasal with the receiving part of said power system, the output signal of said pickup being proportioned to the angular shift of the stator relative to the position corresponding to generator idle operation.

19. A system as claimed in claim 14, wherein said means for measuring the preset power of the prime mover in terms of the signal from the pickup recording the position of said prime mover power setter, comprises means for varying the proportion factor of the signal according to the position of said setter and means for introducing a correcting signal which has been algebraically added up with the signal from said means for varying the proportion factor.

20. A system as claimed in claim 14, wherein said prime mover is a turbine and said means for measuring the preset power of the prime mover in terms of the signal from the pickup recording the position of said prime mover power setter comprises means for varying the proportion factor which can be altered by an outside signal and the signal from the pickup recording the input pressure of the turbine, the proportion factor of said means being equal to 1 at rated pressure and dropping to zero at zero pressure; means for introducing a correcting signal proportioned to the shaft speed of said generator added to the signal of the means for varying the proportion factor, said correcting signal being equal to zero at a rated shaft speed and equalling a signal corresponding to the maximum power setting when the rotation speed of said shaft increases by a non-uniform degree, said signal being subtracted from the signal indicative of the power setting of said prime mover.

21. A system as claimed in claim 14, wherein said prime mover is a turbine and said means for measuring the preset power of the prime mover in terms of the signal from the pickup recording the position of said prime mover power setter comprises means constructed and connected for response to an outside signal and to a signal from the pickup recording the pressure in front of the turbine for varying the proportion factor, the proportion factor being equal to 1 at rated pressure and dropping to zero at zero pressure; means for comparing the output signal of said preset prime mover power measuring means with the power output of said generator; an integrating amplifier having an input connected to the output of said power comparing means; a relay connected for response to a predetermined emergency in said power system for cutting off the input of said integrating amplifier; said integrating amplifier having its output connected for eliminating by its output signal the unbalance of the output signal of said means for measuring the preset power of said prime mover and the power of said generator.

22. A system as claimed in claim 14, wherein behind the means for creating a dead zone there is mounted means for creating a preset small dead zone and a relay operated by the signal from the output of said latter means and delivering a signal which is used to interdict further growth of the setting in said power setter.

23. A system as claimed in claim 14, wherein in front of said second means for separating the maximum signal which controls the power setter, there is mounted a relay operating upon appearance of a signal from said second group of channels and delivering a constant-amplitude signal to said power setter to decrease the setting and interdicting an increase in the power setter setting.

References Cited
UNITED STATES PATENTS 3,344,898  4/1966  Hickox _____ 290—2

ORIS L. RADER, *Primary Examiner.*

G. SIMMONS, *Assistant Examiner.*

U.S. Cl. X.R.

60—105; 290—2